(12) United States Patent
Drey

(10) Patent No.: US 10,664,606 B2
(45) Date of Patent: May 26, 2020

(54) SYSTEM AND METHOD OF CONTROLLING ACCESS TO A DOCUMENT FILE

(71) Applicant: Leonard L. Drey, St. Louis, MO (US)

(72) Inventor: Leonard L. Drey, St. Louis, MO (US)

( * ) Notice: Subject to any disclaimer, the term of this patent is extended or adjusted under 35 U.S.C. 154(b) by 0 days.

(21) Appl. No.: 16/408,556

(22) Filed: May 10, 2019

(65) Prior Publication Data

US 2019/0325149 A1 Oct. 24, 2019

Related U.S. Application Data

(63) Continuation-in-part of application No. 15/600,501, filed on May 19, 2017, now abandoned.

(60) Provisional application No. 62/679,374, filed on Jun. 1, 2018, provisional application No. 62/700,659, filed (Continued)

(51) Int. Cl.
*G06F 21/60* (2013.01)
*G06F 3/06* (2006.01)

(52) U.S. Cl.
CPC .......... *G06F 21/602* (2013.01); *G06F 3/0623* (2013.01); *G06F 3/0652* (2013.01); *G06F 3/0683* (2013.01)

(58) Field of Classification Search
CPC ...... G06F 21/602; G06F 9/451; G06F 3/0623; G06F 3/0652; G06F 3/0683; H04L 63/0254; H04L 63/0281; H04L 63/1425; H04L 67/2804; H04L 69/22
See application file for complete search history.

(56) References Cited

U.S. PATENT DOCUMENTS

| 8,863,305 | B2 * | 10/2014 | Okada | G06F 21/6209 |
| | | | | 726/21 |
| 9,053,325 | B2 * | 6/2015 | Arora | G06F 21/575 |
| 9,058,122 | B1 * | 6/2015 | Nesbit | G06F 3/0659 |

(Continued)

FOREIGN PATENT DOCUMENTS

| JP | 04057151 A | * | 2/1992 |
| JP | 08046711 A | * | 2/1996 |

OTHER PUBLICATIONS

Mandi Haji Abdolvahab, Secure AJAX Authentication without SSL, https://www.codeproject.com/Articles/265305/Secure-Ajax-Authentication-without-SSL, Jan. 3, 2012, pp. 1-7.*

(Continued)

*Primary Examiner* — Farid Homayounmehr
*Assistant Examiner* — Raied A Salman
(74) *Attorney, Agent, or Firm* — IP Strategies

(57) ABSTRACT

A method of controlling access to a document file includes creating the document file, which is a mutable computer-readable file that includes content that is presentable to a user on an electronic display device. The document file is encrypted and provided to a user, including storing the encrypted document file on a content storage device associated with a unique global identifier. Encrypting the document file includes applying an encryption algorithm to the document file to reversibly cipher the document file. Applying the encryption algorithm to the document file includes providing an encryption key and the unique global identifier and actuating the encryption algorithm with the encryption key and the unique global identifier. The encrypted document file can be decrypted and the content presented to the user on an electronic display device through the use of a user interface application.

56 Claims, 12 Drawing Sheets

Related U.S. Application Data on Jul. 19, 2018, provisional application No. 62/782,910, filed on Dec. 20, 2018.

(56) References Cited

U.S. PATENT DOCUMENTS

| | | | | |
|---|---|---|---|---|
| 9,268,957 | B2* | 2/2016 | Frenkel | G06F 21/62 |
| 9,734,348 | B2* | 8/2017 | Erofeev | G06F 21/60 |
| 10,088,981 | B2* | 10/2018 | Hall | G06F 9/451 |
| 2004/0258240 | A1* | 12/2004 | Singh | H04L 9/3066 |
| | | | | 380/30 |
| 2007/0024890 | A1* | 2/2007 | Murata | H04N 1/00244 |
| | | | | 358/1.14 |
| 2008/0037789 | A1* | 2/2008 | Motohashi | G06F 21/6227 |
| | | | | 380/277 |
| 2008/0098455 | A1* | 4/2008 | Hirahara | G06F 21/602 |
| | | | | 726/1 |
| 2009/0208004 | A1* | 8/2009 | Kawai | H04L 9/0825 |
| | | | | 380/45 |
| 2014/0006782 | A1* | 1/2014 | Johnson | G06F 21/62 |
| | | | | 713/168 |
| 2014/0359272 | A1* | 12/2014 | Hiltunen | H04L 9/0877 |
| | | | | 713/150 |
| 2015/0207705 | A1* | 7/2015 | Piercey | H04L 63/102 |
| 2016/0283406 | A1* | 9/2016 | Linga | G06F 21/6209 |
| 2017/0155627 | A1* | 6/2017 | Goel | H04L 63/0815 |
| 2017/0222959 | A1* | 8/2017 | Devasthali | G06F 40/166 |
| 2019/0251198 | A1* | 8/2019 | Shamsutdinov | G06F 16/27 |

OTHER PUBLICATIONS

Humberto Ortiz-Zuazaga, A very small RSA encryption example, https://ccom.uprrp.edu/~humberto/very-small-rsa-example.html, Nov. 18, 2015, pp. 1-5.*

Kyrene G. Alberto, et al., Compiling Remote Files: Redefining Electronic Document Management System Infrastructure (CReED), Jan. 15, 2010, 2009 International Conference on Information and Multimedia Technology, pp. 347-350.*

* cited by examiner

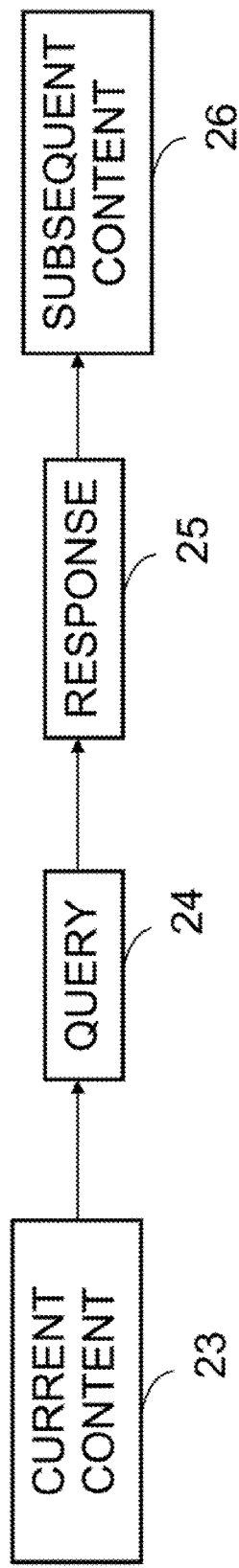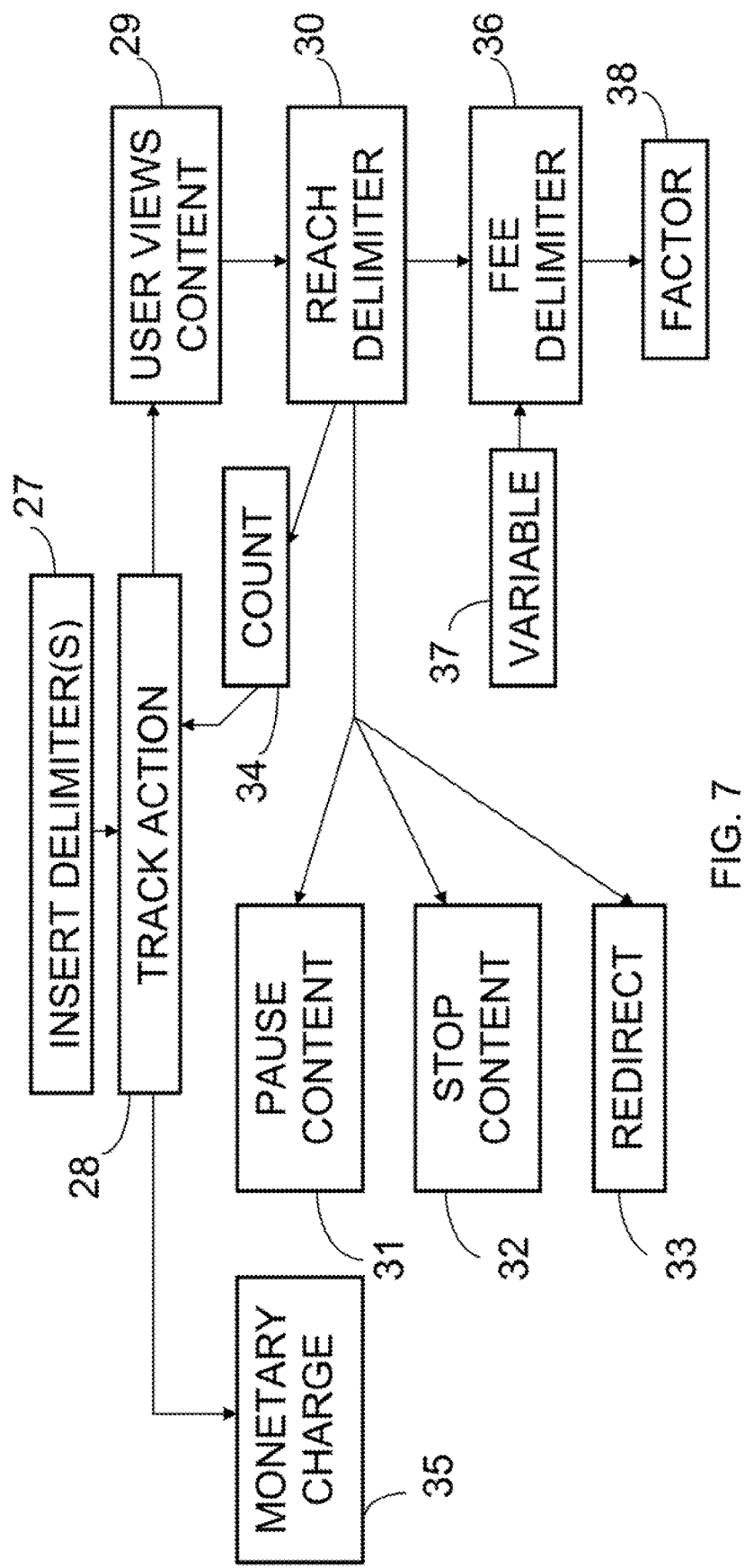

SYSTEM AND METHOD OF CONTROLLING ACCESS TO A DOCUMENT FILE

CROSS-REFERENCE TO RELATED APPLICATIONS

This is a continuation-in-part of U.S. patent application Ser. No. 15/600,501, which was filed on May 19, 2017, which is related to, and claims priority from, U.S. Provisional Application for Patent No. 62/338,816, which was filed on May 19, 2016, U.S. Provisional Application for Patent No. 62/428,673, which was filed on Dec. 1, 2016, and U.S. Provisional Application for Patent No. 62/439,217, which was filed on Dec. 27, 2016; which in turn is a continuation-in-part of U.S. patent application Ser. No. 14/965,855, which is related to, and claims priority from, U.S. Provisional Application for Patent No. 62/090,095, which was filed on Dec. 10, 2014, and U.S. Provisional Application for Patent No. 62/211,112, which was filed on Aug. 28, 2015; which in turn is a continuation-in-part of U.S. patent application Ser. No. 14/524,694, which was filed on Oct. 27, 2014, which is related to, and claims priority from, U.S. Provisional Application for Patent No. 61/895,654, which was filed on Oct. 25, 2013, U.S. Provisional Application for Patent No. 61/904,252, which was filed on Nov. 14, 2013, and U.S. Provisional Application for Patent No. 61/908,383, which was filed on Nov. 25, 2013; and is related to, and claims priority from, U.S. Provisional Application for Patent No. 62/679,374, which was filed on Jun. 1, 2018, U.S. Provisional Application for Patent No. 62/700,659, which was filed on Jul. 19, 2018, and U.S. Provisional Application for Patent No. 62/782,910, which was filed on Dec. 20, 2018; the disclosures of all of which are incorporated herein in their entireties.

FIELD OF THE INVENTION

The invention relates to methods of presenting content to a viewer, for example, on a computer display or a dedicated electronic display device. In particular, the invention relates to a system and method of control over access to the content, including modification of the content.

BACKGROUND OF THE INVENTION

Content, and text in particular, is normally presented in a static fashion. That is, when a reader reads text and other content in hard-copy form, text and images do not change, and subtle nuances in the meaning of what the author wishes to convey must be expressed through the careful choice of words and the linear, static emplacement of words and images. If readers want to understand better, they can read the identical content twice. Content provided to a viewer on a computer has the potential to overcome this constraint, but this capability is underutilized. A need exists to enhance the capability of electronic media so that dynamic content can be provided in ways that will transcend the limitations of static, linear expression.

The concept that there could be, inside a published work, any commenting "hidden pages" between original pages of text, viewable by the reader only after he or she had read some pages further into the document, is a notion that was so unsuited to—would have seemed unsound in—the old world of paper publishing that probably then it had never been considered, despite the usefulness of the approach.

Recently the capacity for Web-based electronic books and articles to be published in various formats has been proffered by certain electronic publishers. However, a limitation shared by all of these pertains to the publisher's inability to limit dissemination of a document after the sale. Electronic books published by these methods can costlessly be multiplied by buyers, quite easily—even to the extent that some electronic publishers do not caution against the practice.

In a similar way problems are faced by especially corporations and governmental organizations stemming from the evident impossibility of preventing confidential documents—even millions at a time—from being surreptitiously copied to small electronic storage devices by individuals who have had access to these legally at the time but now wish to disseminate them illegitimately. It would be optimal if such documents meant to be circulated to members of a carefully selected "core group" reading list, for instance could be copied only onto one electronic storage device, and then locked onto that device permanently.

And similarly, there may be times when an author or publisher would wish it if certain readers—underinformed but at the same time vain, let us say—who have neither the training nor the temperament to comprehend the work at hand, yet would assume that they did while reading—from being able to access the document easily.

Further, sometimes a publisher or an author might find it ideal if a document when being made available online, could be made non-searchable by conventional search engines.

No means has existed to satisfy any of these needs, till now.

BRIEF SUMMARY OF THE INVENTION

By using the present invention, to a large extent an author can prevent potential readers whom he or she would want not to read a work from reading it. As a non-limiting example, if an author has written something that he feels is excessively personal or that he feels the average reader because of a lack of training or lack of exposure to relevant life experiences could not understand, no matter what he or she might think while reading it, that author can limit dissemination by preparing an "acceptables" list of email addresses against which requests for the work would be matched by the publisher's server before being fulfilled.

Through use of the invention, authors will not be able to block everyone whom they did not wish to read a work from getting their hands on it, of course; copies could be borrowed or stolen. But in the author's eyes "the wrong sort of people" will at least not be able to go to the store and buy a copy, click on a link, or have the work drop into their inbox as an unsolicited attachment.

Where the invention is in use as a means of limiting the dissemination of sensitive materials, as for instance in corporations or government agencies, a disgruntled, disturbed, or merely venal employee will be blocked from easily copying up to millions of confidential and/or embarrassing documents to a "Manning device" such as a simple USB memory stick, and then walking away with this in his pocket.

In the same context, it should be noted that for now, documents published under this invention are unsearchable by search engines since the contents are contained within strings.

According to an aspect of the invention, a method of governing content presentation includes creating a document file. The document file is a variable computer-readable file that includes content, which is presented to a user in discrete units in controlled sequence on an electronic display device. A current version of the content, in which fewer than all of the units of the content are viewable by the user, is presented, in which at least some units of unviewable content are disposed prior to the units of viewable content and/or after the units of viewable content. The user performs a predetermined action. In response to performance of the predetermined action, a subsequent version of the content is presented. At least some of the unviewable units of content in the current version of the content are viewable in the subsequent version of the content.

When the predetermined action or another predetermined action is performed by the user, presentation of the content can also be redirected to a different unit of content. This can include, for example, returning presentation of the content to a previous unit of the content. For example, the different unit of content can be a unit of content that was unviewable in the current version.

According to a particular implementation of the method, the subsequent version of the content is not presented on performance of the predetermined action unless a minimum predetermined number of units of content have been viewed by the user prior to performance of the predetermined action.

A monetary charge can be associated with a performance of the predetermined action. For example, a total monetary charge can be increased each time the predetermined action is performed. Each time the total monetary charge is increased, the user can be notified, and indicia can be provided to the user showing the total monetary charge.

The predetermined action can be movement of an action key, which is an element of an input device in communication with a microprocessor device that is in communication with the electronic display device.

At least some of the unviewable content can be, for example, textual content, which can include annotation content.

The size of a unit of content can be defined by the electronic display device.

The electronic display device can be a dedicated content reader.

Preferably, creating a document file does not include writing programming code.

The content can also include at least one data tag, which can include formatting tags, hyperlink tags, image source tags, sound source tags, video source tags, table tags, form tags, frame tags, style tags, div tags, class tags, embed tags, object elements, JavaScript, Java applets Flash units, and/or HTML5 units.

Presenting the content can include reading the document file using a network interface, such as a Web browser.

The document file can be, for example, a plaintext file, an HTML file, and/or an XHTML file. The unviewable content can include advertising content.

The document file can incorporate Javascript.

The predetermined action can be providing a correct response to a query.

The document file can include at least a textual portion, in which case at least one delimiter is inserting at a selected position of the textual portion of the document file, defining delimited content, and predetermined events and/or actions are tracked that occur while the user views units of content. For example, the selected position can be occupied by a particular character combination including the at least one delimiter. When the at least one delimiter is reached as the user views units of content, advancement of content can be stopped until further action is taken by the user, presentation of content can be paused for a selectable, discrete number of time units, and/or presentation of the document file can be automatically redirected to a different location in the document file. Tracking predetermined events and/or actions that occur while the user views units of content can include tracking a number of the delimiters passed by the user while viewing units of content, and/or tracking a number of units of content passed by the user while viewing. The delimiters can include delimiters of more than one type, in which case tracking the delimiters can include separately tracking the delimiters of at least one type. Tracking the number of units of content passed by the user while viewing can include tracking an action by the user causing a subsequent unit of content to be presented, and/or automatically tracking an end of a current presented unit of content for which there is no stop delimiter. The delimiters can be present in the viewable units of content of the current version of the content. A monetary charge can be associated with the tracked number of delimiters passed by the user, the tracked number of units of content passed by the user while viewing, and/or movement of an action key, which is an element of an input device in communication with a microprocessor device that is in communication with the electronic display device. For example, a total monetary charge can be increased each time a delimiter is passed by the user and/or each time the number of units of content is passed while viewing. The unit of content can be, for example, a string. Tracking a number of units of content passed by the user while viewing can include incrementing a string counter, and the associated monetary charge increases when the string counter is incremented. The delimiters can include a fee delimiter, in which case the monetary charge is associated with the tracked number of fee delimiters passed by the user. The fee delimiter can be variable in such a way as to make the associated monetary charge variable. The monetary charge and/or a cumulative monetary charge can be multiplied by a user-associated factor. The user-associated factor can be determined at least in part by, for example, performance by the user of a task, such as a task related to questions regarding substance of the content.

According to another aspect of the invention, a method of governing content presentation includes creating a document file, wherein the document file is a variable computer-readable file that includes content, wherein the content is presented to a user in discrete units in controlled sequence on a display device. A current version of the content is presented in which fewer than all of the units of the content are viewable by the user. At least some units of unviewable content are disposed prior to the units of viewable content and/or after the units of viewable content. At least one delimiter is inserted at a selected position of the document file. Units of content are viewed sequentially by the user. A subsequent version of the content is presented in response to passing the selected position by the user while viewing content, such that at least some of the unviewable units of content in the current version of the content are viewable in the subsequent version of the content.

According to another aspect of the invention, an integrated device includes a storage medium, a microprocessor device, and an electronic display device. The storage medium includes intransient instructions in a variable computer-readable document file that can be implemented by the microprocessor device to cause content to be presented to a user on the electronic display device according to instructions included in a program file portion of the document file. The instructions in the program file include allowing an author to create variable computer-readable content as a text file portion of the document file, wherein the content is presentable on the electronic display device in controlled sequential, discrete units;

presenting on the electronic display device a current version of the content, in which fewer than all of the units of the contents are viewable by the user, wherein at least some units of unviewable content are disposed prior to the units of viewable content and/or after the units of viewable content;

recognizing when a predetermined action is performed by the user; and in response to recognition of performance of the predetermined action, presenting a subsequent version of the content, such that at least some of the unviewable units of content in the current version of the content are viewable in the subsequent version of the content.

The instructions included in the program file are a computer-readable instructions that are largely unvarying and include previously programmed computer code allowing the document file to be executed.

According to an aspect of the invention, a method of governing content presentation includes creating a document file. The document file is a variable computer-readable file that includes content, which is presented to a user in two or more discrete versions in controlled sequence on an electronic display device. A current version of the content, in which units of the content are currently viewable by the user, is presented. The user performs a predetermined action. In response to performance of the predetermined action, a subsequent version of the content is presented. At least one unit of content that is viewable in the current version of the content is not viewable in the subsequent version of the content, and/or at least one unit of content that is not viewable in the current version of the content is viewable in the subsequent version of the content.

According to a particular implementation of the method, the subsequent version of the content is not presented on performance of the predetermined action unless a predetermined minimum number of units of content have been viewed by the user prior to performance of the predetermined action.

A monetary charge can be associated with a performance of the predetermined action. For example, a total monetary charge can be increased each time the predetermined action is performed. Each time the total monetary charge is increased, the user can be notified, and indicia can be provided to the user showing the total monetary charge.

The predetermined action can be movement of an action key, which is an element of an input device in communication with a microprocessor device that is in communication with the electronic display device.

At least some of the content can be, for example, textual content, which can include annotation content.

The size of a unit of content can be defined by the electronic display device.

The electronic display device can be a dedicated content reader.

Preferably, creating a document file does not include writing programming code.

The content can also include at least one data tag, which can include formatting tags, hyperlink tags, image source tags, sound source tags, video source tags, table tags, form tags, frame tags, style tags, div tags, class tags, embed tags, object elements, JavaScript, Java applets, Flash units, and/or HTML5 units.

Presenting the content can include reading the document file using a network interface, such as a Web browser.

The document file can be, for example, a plaintext file, an HTML file, and/or an XHTML file. The unviewable content can include advertising content.

The document file can incorporate Javascript.

The predetermined action can be providing a correct response to a query.

The document file can include at least a textual portion, in which case at least one delimiter is inserting at a selected position of the textual portion of the document file, defining delimited content, and predetermined events and/or actions are tracked that occur while the user views units of content. For example, the selected position can be occupied by a particular character combination including the at least one delimiter. When the at least one delimiter is reached as the user views units of content, advancement of content can be stopped until further action is taken by the user, presentation of content can be paused for a selectable, discrete number of time units, and/or presentation of the document file can be automatically redirected to a different location in the document file. Tracking predetermined events and/or actions that occur while the user views units of content can include tracking a number of the delimiters passed by the user while viewing units of content, and/or tracking a number of units of content passed by the user while viewing. The delimiters can include delimiters of more than one type, in which case tracking the delimiters can include separately tracking the delimiters of at least one type. Tracking a number of units of content passed by the user while viewing can include tracking an action by the user causing a subsequent unit of content to be presented, and/or automatically tracking an end of a current presented unit of content for which there is no stop delimiter. The delimiters can be present in the viewable units of content of the current version of the content. A monetary charge can be associated with the tracked number of delimiters passed by the user, the tracked number of units of content passed by the user while viewing, and/or movement of an action key, which is an element of an input device in communication with a microprocessor device that is in communication with the electronic display device. For example, a total monetary charge can be increased each time a delimiter is passed by the user and/or each time the number of units of content is passed while viewing. The unit of content can be, for example, a string. Tracking a number of units of content passed by the user while viewing can include incrementing a string counter, and the associated monetary charge can increase when the string counter is incremented. The delimiters can include a fee delimiter, in which case the monetary charge can be associated with the tracked number of fee delimiters passed by the user. The fee delimiter can be variable in such a way as to make the associated monetary charge variable. The monetary charge and/or a cumulative monetary charge can be multiplied by a user-associated, which can be determined at least in part by performance by the user of a task, such as a task related to questions regarding substance of the content.

According to another aspect of the invention, a method of governing content presentation includes creating a document file, wherein the document file is a variable computer-readable file that includes content, wherein the content is presented to a user in two or more discrete versions in controlled sequence on an electronic display device. A current version of the content is presented in which units of the content are currently viewable by the user. At least one delimiter is inserted at a selected position of the document file. Units of content are viewed sequentially by the user. A subsequent version of the content is presented in response to passing the selected position by the user while viewing content, such that at least one unit of content that is viewable in the current version of the content is not viewable in the subsequent version of the content, and/or at least one unit of content that is not viewable in the current version of the content is viewable in the subsequent version of the content.

According to another aspect of the invention, an integrated device includes a storage medium, a microprocessor device, and an electronic display device. The storage medium includes intransient instructions in a variable computer-readable document file that can be implemented by the microprocessor device to cause content to be presented to a user on the electronic display device according to instructions included in a program file portion of the document file. The instructions in the program file include allowing an author to create variable computer-readable content as a text file portion of the document file, wherein the content is presented to a user in two or more discrete versions in controlled sequence on an electronic display device;

presenting on the electronic display device a current version of the content, in which units of the content are currently viewable by the user;

recognizing when a predetermined action is performed by the user; and in response to recognition of performance of the predetermined action, presenting a subsequent version of the content, such that at least one unit of content that is viewable in the current version of the content is not viewable in the subsequent version of the content, and/or at least one unit of content that is not viewable in the current version of the content is viewable in the subsequent version of the content.

The instructions included in the program file are a computer-readable instructions that are largely unvarying and include previously programmed computer code allowing the document file to be executed.

According to another aspect of the invention, a method of preventing unauthorized modification of a document file includes creating a document file. The document file is a variable computer-readable file that includes content, which is presentable to a user on an electronic display device. A browser, a jump drive operating system, and/or the document file can be modified, for example, such that the document file includes a designated extension. For example, the modifications can conjointly render the modified document file unable to be duplicated. Modifying the jump drive operating system can include restricting the jump drive operating system such that modified document files on the modified jump drive cannot be opened by other than the modified browser.

The designated extension can render the modified document file unable to be stored except on a modified jump drive, which is a jump drive including the modified jump drive operating system. The modified jump drive can be a first modified jump drive, and the modifications can conjointly render the modified document file able to be moved from an original storage location only if the modified document file is stored on a second modified jump drive. Alternatively, or in addition, the modifications can conjointly render the modified document file able to be moved to a second modified jump drive only if the modified document file is erased from the first modified jump drive, and unable to be moved to a different modified jump drive otherwise.

The modified document file document file, stored on the modified jump drive, can be altered by a user. The modifications can conjointly render the modified document file having the altered text file portion able to be stored only on the modified jump drive to replace the original text file. The modified document file can be altered by a user by copying only a text file portion of the modified document file using a modified word processor that is configured within the modified browser, altering the copied text file portion of the modified document file using the modified word processor, storing the altered copied text file portion of the modified document file using the modified word processor by replacing the text file portion of the modified document file stored on the modified jump drive by the altered copied text file portion of the modified document file, and using the modified browser conjointly with the modified jump drive operating system to store the altered modified document file. In this case, the browser can be restricted such that it can only open a text file using the modified word processor, and the word processor can be restricted such that it can only store an altered text file to replace the original text file in the original document file on the original jump drive.

In addition, a container ID and an operating executable file can be stored on a jump drive associated with the modified jump drive operating system. A filename can be assigned to the modified document file in which the filename includes a designated filename code. A designated browser code can be assigned to the modified browser. The modified document file can be stored on the jump drive. An operating program associated with the operating executable file can be used to determine if the filename code is valid, based on a predetermined criterion. The operating program associated with the operating executable file can be used to determine if the browser code is valid, based on a predetermined criterion, A condition can be applied such that opening the modified document file in a browser window by the modified browser occurs only if the filename code and the browser code are both determined to be valid, otherwise opening the modified document file is refrained. The container ID can be registered with a publisher, and storage of the modified document file on any jump drive having an unregistered container ID can be prevented.

The method can also include creating an executable file including the modified document file at a first device. The executable file can be transferred from the first device to a receiving device, which is the first device or a second device. The modified document file can be opened from the executable file only if the receiving device is communicatively connected to a jump drive having a registered container ID; in this case, the modified document file is stored on a jump drive having a registered container ID. Opening the modified document file if the receiving device is not communicatively connected to a jump drive having a registered container ID can be prevented. Transferring the executable file from the first device to a receiving device can include emailing the executable file.

An electronic document according to the invention can be distributed by the publisher as an email attachment. In an exemplary implementation of the invention, when a modified "registered" jump drive is connected via a USB port of the computer—this, determined by the system software of the modified Web browser, by checking the container ID of the jump drive—and is contents stored on the computer, there is a modified Web browser having software that bears a suitable alphanumeric code—the appropriateness of the alphanumeric code determined by the operating system of the modified jump drive. The system software of the modified Web browser, or in an alternate implementation the operating system of the modified jump drive, will cause an operating executable file to be extracted from the email attachment and stored directly to the modified jump drive. During extraction and storage, the operating executable file will be assigned a filename embracing an alphanumeric code recognizable by the jump drive operating system and the system software of the modified Web browser as corresponding to the particular modified registered jump drive.

Thereafter, the operating executable file, stored only in a single location—on the particular modified registered jump drive to which it had originally been stored at the time of extraction of the email attachment representing the original electronic document—will not be openable or operable except by a modified Web browser, whether this browser is housed on the original computer or some other suitable electronic device. The operating executable file corresponding to the original electronic document cannot be read and the text-file source code cannot be viewed or modified, and then after modification if any, cannot again be stored except from and to the original modified registered jump drive.

Thus in general terms, removal of the operating executable file from the particular modified registered jump drive to which it had originally been stored will not be permitted by the system software of the modified browser. If alteration of the text-file of the original operating executable file by a user occurs, storage of the resulting altered operating executable file will not be permitted anywhere except to the original modified registered jump drive. Likewise, duplication of the operating executable file on the original modified registered jump drive or to another such modified registered jump drive, or to any other electronic device, will not be permitted by the Web browser modified according to the invention.

According to another aspect of the invention, a system of controlling access to a document file includes a content management system, a dedicated user interface application, and a storage device. The user interface application, such as a browser, runs on the user's computer or other processing device, and presents the content to the user subject to an encryption scheme enforced by the content management system. The content is stored on the storage device, which can be a portable storage device such as a thumb drive, or an internal hard drive. The content can also be stored on a device at a server and made available via network connection, or can be stored on a physical storage medium such as a compact disk, which can be read at the process by an appropriate reader. The storage device, medium, or reader has associated with it a globally unique identifier, such as a serial number, that is not discernable through physical inspection or routine reading of the output of the device, medium, or reader. This device is registered with the content management system by its identifier.

The method includes creating a document file. The document file is a mutable computer-readable file that includes the content, which is presentable to a user on an electronic display device. The document file is then encrypted, according to a scheme administered by the content management system. The encryption scheme incorporates the globally unique identifier and an encryption key, which are applied as inputs to an encryption algorithm according to the scheme when encrypting the file. Thus, to access the unencrypted file, a decryption scheme must be incorporated that applies both an identifier associated with the globally unique identifier and a decryption key associated with the encryption key to a decryption algorithm corresponding to the encryption algorithm. The decryption key can be, for example, embedded in the user interface application such that accessing the decrypted file through the use of another interface or browser is not possible. In this way, the content management system controls access to the document file and therefore the content.

Access restrictions to the file enforced by the encryption can, for example, render the document file unable to be duplicated. Further, the content management system can restrict storage of the document file to the device or medium associated with the globally unique identifier, and even then preferably only if the document file is first encrypted. For example, if the document file is first made available to a user in encrypted form on a portable storage device, the user would be able to view the unencrypted document only if the processing device has an ID associated with the globally unique identifier of that portable storage device, using the user interface application embedded with a proper decryption key. The document file would be stored temporarily on the user's processing device while being viewed, but preferably would only be savable back to the portable storage device having the globally unique identifier, and only in encrypted form. Preferably, the document file would be erased permanently from the user's processing system when encrypted and saved back to the portable storage device. For example, erasing of the document file can be made automatic as part of the encryption or saving processes.

In some cases, the content management system can allow storage of the document file from the user's processing device to a different storage device or medium. In such a case, the document file would be first be encrypted using an ID associated with the globally unique identifier of the different storage device or medium. Preferably, the encrypted document file would not be stored to the different storage device or medium unless it is also permanently erased from the original storage device and the user's processing device.

If authorized by the publisher, the content of the document file can be altered by a user. Preferably, the content management system will render the modified document file having the altered content able to be stored only on the storage device or medium having the globally unique identifier, to replace the original document file. The modified document file can be altered by a user by copying the content of the modified document file using a content editor that is configured within the modified user interface application, altering the copied content of the modified document file using the content editor, storing the altered copied content of the modified document file using the content editor by replacing the content of the modified document file stored on the authorized storage device or medium by the altered copied content of the modified document file, and using the user interface conjointly with the storage device or medium to store the altered modified document file. In this case, the user interface can be configured such that it can only open content using the embedded content editor, and the content editor can be restricted such that it can only store altered content to replace the original content in the original document file on the storage device or medium. These restrictions are all enforced by the content management system through the use of encryption as described above.

The method can also include creating an executable file including the modified document file at a first device. The executable file can be transferred from the first device to a receiving device, which is the first device or a second device. The modified document file can be opened from the executable file only if the receiving device is communicatively connected to storage device having a registered globally unique identifier; in this case, the modified document file is stored on a storage device having a registered globally unique identifier. Opening the modified document file if the receiving device is not communicatively connected to a storage device having a registered globally unique identifier can be prevented by the content management system by enforcing this policy through encryption. Transferring the executable file from the first device to a receiving device can include emailing the executable file, for example, or any other file transfer mechanism, such as http download.

An electronic document according to the invention can be distributed by the publisher, for example, as an email attachment. In an exemplary implementation of the invention, when a "registered" portable storage device is connected via a USB port of the computer—this, determined by the system software of the user interface application, by checking the globally unique identifier of the storage device—and is contents stored on the computer, there is a user interface application having software that bears a suitable alphanumeric code—the appropriateness of the alphanumeric code determined by the storage device. The system software of the user interface application, or in an alternative implementation software resident on the storage device, will cause an operating executable file to be extracted from the email attachment and stored directly to the storage device. During extraction and storage, the operating executable file will be assigned a filename embracing an alphanumeric code recognizable by the storage device software and the user interface application as corresponding to the particular registered storage device.

Thereafter, the operating executable file, stored only in a single location—on the particular registered storage device to which it had originally been stored at the time of extraction of the email attachment representing the original electronic document—will not be openable or operable except by the user interface application associated with the content management system, whether this user interface is housed on the original computer or some other suitable electronic device. The operating executable file corresponding to the original electronic document cannot be read and the content file source code cannot be viewed or modified, and then after modification if any, cannot again be stored except from and to the original registered storage device.

Thus in general terms, removal of the operating executable file from the particular registered storage device to which it had originally been stored will not be permitted by the user interface application. If alteration of the content file of the original operating executable file by a user occurs, storage of the resulting altered operating executable file will not be permitted anywhere except to the original registered storage device. Likewise, duplication of the operating executable file on the original registered storage device or to another such registered storage device, or to any other electronic device, will not be permitted by the user interface application according to the invention.

The system and method of the present invention uses encryption techniques to control access to a document file that includes content. Encryption is used to enforce the access controls and to ensure the integrity of transactions between the publisher and users. As described, the invention utilizes encryption and decryption algorithms and keys to implement the cryptographic techniques. It is contemplated that any type of symmetric or asymmetric encryption scheme known or devisable to those of skill in the art would be applicable to the invention, and although specific examples of cryptographic schemes might be disclosed, it is not intended that the invention be limited to any such scheme or implementation.

According to an aspect of the invention, a method of controlling access to a document file includes creating a document file. The document file is a mutable computer-readable file that includes content, which is presentable to a user on an electronic display device. The document file is encrypted, and the encrypted document file is provided to a user. This includes storing the encrypted document file on a content storage device that is associated with a unique global identifier, for example, a thumb drive having a unique serial number or container ID. Encrypting the document file includes applying an encryption algorithm to the document file to reversibly cipher the document file. Applying the encryption algorithm to the document file includes providing an encryption key and the unique global identifier and actuating the encryption algorithm with the encryption key and the unique global identifier. Thus, the encrypted document file will be ciphered in a way that links it to the identifier of the content storage device and to the encryption key, which preferably is managed by the publisher.

To access the document file, the user can open a user interface application or browser on a processing device. The content storage device can be coupled for communication with the processing device. By way of the user interface application, the user can select the encrypted document file for access. The user interface application can then decrypt the encrypted document file, and the content included in the decrypted document file is then presented to the user on the electronic display device, within the user interface application. Decrypting the encrypted document file includes applying a decryption algorithm associated with the encryption algorithm to the encrypted document file to decipher the encrypted document file. Applying the decryption algorithm to the encrypted document file includes providing a decryption key associated with the encryption key, and the unique global identifier, and actuating the decryption algorithm with the decryption key and the unique global identifier. Thus, the document file can only be accessed, and the content viewed, if a key corresponding to the encryption key is available, and also if the unique global identifier is available, and if the appropriate decryption algorithm is used.

Preferably, the decryption algorithm is embedded within the user interface application. Thus, the algorithm is applied only through use of the interface. Likewise, the unique global identifier to be applied to the decryption algorithm is stored in a processor storage device accessible by the user interface application, preferably only be the user interface application. The identifier can be provided to the user with the interface download, thereby linking the particular interface software provided to the user with the global identifier for the content storage device to be used by the user. To protect against compromise of the identifier, it can be encrypted prior to storing the unique global identifier in the processor storage device, and the user interface application can decrypt the encrypted unique global identifier prior to decrypting the encrypted document file.

Likewise, the decryption key can be stored in a processor storage device accessible by the user interface application. The decryption key can also be encrypted prior to storing the decryption key in the processor storage device. The user interface application can then decrypt the encrypted decryption key prior to decrypting the encrypted document file.

The decrypted document file is configured to be opened only within the user interface application. Because the components necessary to decrypt the encrypted document file are embedded within or only accessible by the user interface, the encrypted document file can only be decrypted and content presented to the user through use of the user interface. Once opened, other access controls can be implemented by the interface application to designate what can be done with the decrypted document file.

For example, the user interface application can be configured to control access to the decrypted document file by preventing duplication of the decrypted document file. This access control, like any other access control implemented by the interface, can be fixed or can be made conditional or limited. For example, a particular user could attain a status, through payment or otherwise, that would allow the user to make duplicate copies of the document file, or a limited number of such copies.

Preferably, the user interface application controls access to the decrypted document file by preventing storage of the decrypted document file other than on the content storage device having the unique global identifier. Thus, the user would receive the document file on the designated storage device and would only be able to save the document file back to the same storage device. Preferably, the document file would be encrypted by the user interface application prior storage on the content storage device.

As another example, the user interface application can control access to the decrypted document file by preventing modification of the decrypted document file by the user. Again, this control could be made fixed, or could be conditional or limited, in which case controlling access to the decrypted document file includes allowing, by the user interface application, modification of the decrypted document file by the user. If modification is allowed, the decrypted document file is loaded into temporary storage in the processing device and only a text file portion of the decrypted document file is copied using a text editor that is configured within the user interface application. The copied text file portion of the decrypted document file is then modified using the text editor and the modified copied text file portion of the decrypted document file is stored by replacing the text file portion of the decrypted document file stored in the temporary storage by the modified copied text file portion of the modified document file.

When the decrypted document file is to be presented to the user on the electronic display device, the decrypted document file is loaded into temporary storage in the processing device. To be sure that content can't be viewed by the user and also be available on the content storage device, the user interface application erases the document file from the content storage device when loading the decrypted document file into temporary storage in the processing device, and erases the document file from the temporary storage when transferring the document file to the content storage device.

However, content can be stored on a different content storage device than the device that was first provided to the user, under certain circumstances. In this way, for example, content can be provided to the user on a first thumb drive, and later stored to a second thumb drive. It is preferable, however, that only one instance of the document file exist in the possession of the user.

In this case, the content storage device is a first content storage device and the unique global identifier is a first unique global identifier. A second content storage device is coupled for communication with the processing device, the second content storage device being associated with a second unique global identifier. The processor storage device is checked for the second unique global identifier, and the document file is stored on the second content storage device only if the second unique global identifier is stored in the processor storage device. The user interface application erases the document file from the temporary storage when transferring the document file to the second content storage device.

The document file can be an executable file. Providing the encrypted document file to the user can include emailing the executable file to the user.

BRIEF DESCRIPTION OF THE DRAWINGS

FIG. 6 is a flow diagram of an exemplary query process of the invention.
FIGS. 7 and 8 are flow diagrams of exemplary delimiter processes of the invention.

DETAILED DESCRIPTION OF THE INVENTION

Figure 1:
FIG. 1 is a block diagram of an exemplary document file.

The present invention provides a way for presenting a document consisting of text characters and/or other content to a viewer, such as a computer user, in multiple versions which can be temporally sequenced according to the depression of one or more predetermined control or action keys as specified by the author of the document being viewed. For example, according to the invention, a document can include words, letters, numerals, symbols, blocks of color, digital photographs, graphical images, movies, sound, any other visual and/or audio binary file, forms or interactive forms, structured data, markup language data, links, and Web pages, which can be presented on a viewer's display sequentially as two or more versions, both of these or all of these controlled by the reader using an action key or keys, the second and/or later versions being brought before the viewer only once he or she has struck the pertinent action key, or, according to an alternate construction of the invention's program file, automatically being brought before the viewer once a certain point or points in a document file, as determined by the document's author, has or have been reached by the viewer, such points being, for example, the end of the last string and page of the first version of the document.

In a broad embodiment of the invention, after a designated action by the user, the initial version of the document is replaced by the second version, which may include more, different, or otherwise less material than the original document. For example, the initial version can be replaced with a second version that is identical to the initial version with the exception that it includes additional text on or following some or all of the pages of the initial version. Per a decision made by the author or editor, an indefinite number of subsequent versions can be presented, each differing in some manner from the one previous to it. Thus, a one-page document can be replaced, for example, by a similar document having as a second page, the first page now with certain annotations. Or otherwise, a "logically complete" single-page document can be supplemented by one or more additional pages that are subordinate to or otherwise related to it. A document can continue to be expanded through the presentation of subsequent versions, serially. The initial version can include, constitute, or encompass typed or hand-written notes, an author's outline, précis, or summary, or any other preliminary aspect of the writing process that then will be developed through the presentation of subsequent versions into a progressively more complex and/or complete work of description, narration, and/or explication.

It can also be the case that notes, an outline, and/or other preliminary aspects of the writing process can follow a complete work, or be placed within it at an intermediate point or some intermediate points.

An electronic document, after having been published, can be modified by the author or editors, for instance, to discuss continuing developments in a news cycle or in a course of scientific discovery, to embrace readers' comments including criticisms of the initial document, or simply to air the author's or editors' further reflections on the subject matter after some passage of time. Such additional material can be folded into the initial version in the form of additions to and annotations on the original pages, or can be made up into a more complex and refined, separate, new serial version.

Versions of the document can differ by the presence of "interleaves" disposed in a second and any subsequent versions of the document as presented to the user, each version of the document file being sequentially read by a microprocessor device according to instructions contained in the program file and subordinately, the text file. If for example there are two versions of a document, the first version will bypass all of the interleaves and only the second version present the interleaves in their proper order. Or the interleaves can be present in the first version, or second or further versions, but not viewable until activation of a particular action key by the user; or otherwise, interleaves pertaining to the first version, or second or further versions, can be present elsewhere than within the respective version and not viewable except with activation of a particular action key by the viewer, with activation of the same or different action key required to return the viewer to the respective version. In other words, the electronic publication will have multiple interleaves hidden between designated pages or sections of the document as originally presented to a viewer. These interleaves normally will be hidden from the reader so by the document's author's design, the viewer will not see them the first time reading through the book. Then, after a predetermined action, such as actuation of a predetermined key by the viewer, the second version of the content is presented to the viewer. The second version includes interleaved content that was not available to the viewer when accessing the first version (unless incorrectly, the reader engages in the predetermined action to summon the interleaves other than at the point or points intended by the author). Preferably, the viewer is automatically brought to the beginning of the content when accessing the second version, although this is not necessarily the case. If the author wishes to, he or she may create at the beginning of the first, second, or any further version a "hidden preface," an indefinitely large number of pages and strings that will be presented to the viewer only once he or she activates a particular action key, the hidden preface in any version therefore being accessed before the reader reaches for a second time, the first page of that version. In a like manner, if the author wishes to, he or she may create at the end of the first, second, or any further version a "hidden afterword," an indefinitely large number of strings and pages that will be presented to the viewer only once a particular action key has been activated by the viewer, and after the end of the last page and string of the first, second, or any further version has been reached by the viewer.

Thus, according to the invention, the author or a commentator can provide interleaved material that complements or comments on the original material. For example, the interleaved content can include notes by the author of the original work, scholarly comments and interpretations by others, and historical and geographical facts related to passages in the content provided. Material in interleaves may be written by the author, editors, or later commentators, and interleaved material may qualify or advance the initially presented material.

Educational material, other non-fiction works, or essay "interleaved" publications may be pitched at two levels: on the first level, to the reader who is somewhat new to the information and to the conclusions that the author wishes to convey, and on the second level, to the same individual who is now familiar with these in outline and is ready to be exposed to and to take in, through a non-linear commentary on the simpler work, more advanced ideas that are more nuanced and more emphatic and focused than is possible in conventional, that is to say, linear publishing. Via use of the invention, readers will be provided with a more nuanced and complex analysis of ideas and facts, or a more "qualified" and tentative presentation of ideas and facts, or a more advanced presentation of ideas and facts, than they could have been, before. Furthermore, works of fiction, including adult, children's, and juvenile fiction, as well as comics and graphic novels, can be published according to the invention. Likewise, works consisting in part or in their entirety of pages containing photographs or other works of art can be published according to the invention.

If an author wishes to write a preface that initially cannot be seen by the viewer, he or she may do so by interspersing a certain number of blank screens that will be passed over as the program is automatically progressing to the first visible page; the author may construct an "invisible preface" by alternating blank pages with a coordinate number of interleaves. A similar thing may be done to create an "invisible afterword." In both cases, the program will proceed automatically and rapidly in succession through these blank screens because the author will not have inserted a "pause delimiter" or a "stop delimiter" within the strings coding for each of these blank screens. The initially invisible preface or the initially invisible afterword can be of any number of pages in length, according to the author's preference.

From a commercial standpoint, the invention provides advantageous ways to generate revenue. For example, a publisher of the content can make the first version of the content free of advertising, but can include paid advertisements in some or all of the interleaved content revealed in the second version. Alternatively, the publisher can provide a free, first incomplete summary version, and a second, more complete version of the same that is available only on payment of a fee. To access the second version, readers can be required to pay at a constant rate or at an often-varying or a constantly varying page-rate, as determined by the publisher. A publisher can offer readers the option of previewing a predetermined fraction of the content without charge to determine their level of interest, before they decide to begin paying to access further parts of the complete publication.

A single action key to invoke the second version of a document will be referred to herein, but the invention is not contemplated necessarily to be limited to a single action key, and more than one key can be designated as action keys if desired. More than two versions of a document are possible; thus, more than one set of interleaves are possible. If more than one set of interleaves are authored, the same action key or more than one action key can be used to summon the different interleaved versions. The action key can be, for example, the <LEFT-ARROW> key on a standard computer keyboard. Specialized keys on a dedicated device can be provided to implement functionality.

According to a particular embodiment of the invention, series of additions to or alterations of an original version of a document can be presented sequentially to the viewer, wherein the sequencing of the modified versions is predetermined by the author at the time of authoring of the text, and the viewing of a first or subsequent modified version can be invoked by the viewer according to the depression of an action key.

For example, a document, such as a book in electronic form, can be presented to a viewer. This document can be stored locally, such as in memory in a computer or a portable electronic device on which the document is viewed. Alternatively, the document can be stored remotely, such as on a remote computer, and streamed to or otherwise provided to a computer or other electronic device via a network or peer-to-peer connection.

Multiple action keys can be utilized, such that pressing any of these will return a reader to a different "re-starting point" in the original document. Such keys preferably are sequential number keys, letter keys, or combinations of keys, but may be any ordinary keyboard keys designated by the author or publisher. They may also be special keys on a specially designed dedicated device. A second "back function" and/or a second "forward function" can be used to allow the reader to progress backward or otherwise forward through a document one string at a time—that is to say, without interleaves being "jumped over" as would be anticipated for instance when the viewer was proceeding through a document in the forward direction for the first time—for example to permit an author to expand on the meaning of a new term or concept that appears in the original text, now in notes presented in the preceding or otherwise the following interleaf. Where such a "string-at-a-time" function is operable, the program file can be modified to limit the number of back or the number of forward keystrokes permissible at one time, in order to prevent reader confusion and/or to prevent fee delimiters from being bypassed. For the same reasons, the program file can be modified to prevent back-to-the-beginning or back-to-another-point keys from being activated before a reader has reached a predetermined point in the document.

If an author intends to utilize both types of interleaves in the same document according to the invention, that is, interleaves of the "go back to a certain re-starting page" type, and interleaves of the "go-one-string-at-a-time" type, he or she can modify the operating program's "skip" number, the number of interleaf strings that are automatically skipped over per "forward" action key strike by a user during a first reading of a document, so that this number will be the number of interleaf pages found between every pair of pages of original text, plus one. Where such a modification to this number is made, readers who have been advancing through interleaves of the first type, at the author's discretion will encounter at least one blank screen before reaching interleaves of the second type, when both types of interleaves are present between successive pages of the original text. In, for example, such a "mixed set" of interleaves where between every pair of pages of original text there are always three interleaves, the first in a set will refer to the prior page of original text and the second will be blank, whereas the third will refer to the following page of original text.

The optional availability of interleaf pages other than simple blank pages at a point in a document may be made known to users through placement of a "flag" in the original text by the author or editor. As necessary, this flag will designate the specific key to be pressed.

The original "very simplest" version of the document, in this example a book, can be provided to the viewer, either for free or on payment of a fee or purchase price. When the viewer has finished reading the book, or at another time of the viewer's choosing, the viewer can, by going back to the beginning of the book, or by going back to another point in the original version of the book that has been chosen by the author as a re-starting point—or by otherwise indicating that he or she wants to view the second version of the book—view previously unseen material; alternatively, the viewer can be brought back automatically to the beginning of the book or to any other re-starting point when he or she has reached a certain point or points in the original version of the book as determined by the author. At that time, the previously unseen material, including the previously-missing "interleaves," will be presented to the viewer. The viewer may have to provide payment to view the second version. In particular interleaves provided can include, for example, formatted and in-a-different-background-color "boxed notations" resembling footnotes, which need not be located at the bottom of a page, yet may be disposed in any location on a page, to provide insight into different aspects of the book. These aspects of the book may not have been able to be presented by the author in the initially viewed version for reasons of comprehensibility. The notations can include, for example, scholarly insights, references, illustrations, and links to related reading material that was written by the same or other authors. The ability for the viewer to highlight or add his or her own notations to the original text or interleaved text can also be enabled by the reader through summoning the source code of a document, and then altering it by adding his or her own "reader's notes." Such notes may comprise passages added by the reader at the end of pre-existing paragraphs or screens of text, or may be made to appear anywhere on the screen in colored "boxes," formatted by the author using the Cascading Style Sheets (CSS) function of HTML, for example. Paid advertisements that must be read or watched by the reader before proceeding to further interleaves, or past "stop delimiters" to further notations within a single interleaf, can also be included. Interactive content, such as questions asked of the viewer, to which the viewer may or must respond before proceeding further in an interleaved version, can also be included. In this case, subsequent material or a complete, subsequent version consisting of additional interleaves can be provided if the viewer has correctly answered questions that have been written by the author. Alternatively, additional interleaves can be provided to a viewer regardless of the correctness of the reader's answers, yet the price that the reader pays per page to generate further interleaves can be incremented or decremented according to a predetermined mathematical formula, depending on the accurateness of the reader's answers.

According to an alternative embodiment of the invention, the initially seen version of the document is a concise and abbreviated version, or an abridged version, which becomes complete in the second version or in another subsequent version. This allows the publisher to give a prospective purchaser a preview of a book or other content at no or little cost in the first version, and the complete document in a subsequent version, on payment of a fee and/or acceptance of advertisements. The content that completes the document, and any optional advertising, is present in the interleaves that are only accessible to the viewer in the second or a subsequent version. Interleaved pages available only in the second or subsequent versions may greatly outnumber those available in the initially seen version, so that only a spare outline of the document can be previewed.

To implement the method of the invention, text is written by an author/programmer so as to be read by a reader's computer, or other microprocessor-driven device, as computer code. This code can be, for example, similar to or no different from ordinary HTML code, yet the method of the invention provides several advantages. The code includes delimiters that the author can use when writing/coding that will stop or delay presentation of content to the viewer, charge viewers a variable amount as that point in the document is passed, or return to the beginning of the document. These delimiters can be combined. So, for example, the document can be returned to the beginning after passing an end-of-document delimiter, at which point, once progression of the document has stopped, the viewer can be prompted for payment as a condition to view the subsequent version of the document, including interleaves.

In a preferred embodiment, the text or other content is authored such that text, or the ordinary language of HTML or XHTML or another compatible language for the Web, is augmented with new delimiters. The text is coded by the author in "strings" that include the delimiters, wherein each string presents a new screen of text. For example, a string can begin with ---
LABEL(" ...
and end with
... )";
--- to identify delimited text, where "LABEL" is a label chosen by the author to designate the delimiter. A first delimiter allows the author to allow the viewer to advance presentation of the content, while a second delimiter allows the author to delay presentation of the document a preset number of tenths of a second, and a third delimiter allows the author to return presentation of the document to the beginning or some other point in the document, irrespective of any action by the reader. Although three such delimiters are described herein, additional or different delimiters can be used to provide similar or different functions, as will be apparent to one of skill in the art. According to the method of the invention, all formatting features of HTML can be used. Retaining the broad feature set capability of HTML provides great advantages to the author.

Annotations can also be made to appear or go away at the stroke of an action key. For example, these notes can appear in indented and highlighted boxes, or in any other format of the author's choosing, once the interleaves are enabled. Highlighting or other emphasis of text can also arise, timed to appear automatically according to the author's specification or on depression of the action key by the viewer.

HTML documents can be made to appear as advertisements that appear on the viewer's screen, one by one, in a timed sequence or at the control of the viewer, once interleaves are enabled in a second or subsequent version. For boxes or pages to appear in an automatic timed sequence within or as a complete individual string that makes up a non-interleaf page, a delay delimiter can be inserted. For example, ^^25^ or a similar delimiter is inserted, where "^" is a space, and where "space-space-number-space" is the incremental delay delimiter denoting the number of incremental delay units selected by the author/programmer, here measured in tenths of a second. Likewise, in non-interleaf pages "space-space-vertical pipe-space" (^^|^) can be used as the "stop until the action key is depressed" delimiter, so that pages can change at the control of the viewer. An "automatic blank screen" string, for example,

LABEL(" ");

can be made to occur between non-interleaf strings, to generate a momentarily blank screen between screens of text. At the same time, insertion of such a blank screen will cause the first element of the following screen to be placed correctly in terms of its vertical location on the screen, rather than being placing arbitrarily according to the location of the elements that were last read in the prior screen.

According to an exemplary general process of the invention, the author creates a document file by authoring content that preferably includes text. Predetermined portions of the text are delimited in order to define delimited content. The document file is then read by a microprocessor device and displayed to a viewer, and the delimited content is displayed differently than other portions of the content of the document file according to the nature of the delimiters chosen by the author/programmer. The coding of the delimiters can be made transparent to the author, because this coding is concealed in the document file within the program file, separately from the text file and in a way that the author is not expected to modify, or need to modify. Therefore, computer programming skills are not needed at the time of authoring or formatting of an article or book. For example, an author may apply any delimiters of his or her choosing through utilizing the same word processing program he or she uses to author ordinary static-text documents. Regardless of location, delimiters will "drop out" in the sense that although they will have meaning to the microprocessor running the conjoint document and program files, the viewer will never see the characters or the spaces of the delimiters on his or her screen.

The document file need not only include text, and instead can be a multimedia file including still and moving images and sound as content, any portion of which can be delimited. Further, HTML files and XHTML files can be document files that are authored according to the invention, and any section of such a document can be delimited for controlled presentation to a viewer.

As part of the authoring process, the author defines delimited content in the document file as the text file component of the document file is first authored, or later, in a separate delimiting action. The viewer will display the document on a microprocessor device such as a computer or dedicated document reader, which will identify the delimited content and present it to the viewer as specified by the author. If the computer or other viewing device is connected to a network, a conjoint text and program file can be stored on a server or in a location at which it can be accessed by a server, and a network interface program can be used to view the document file. Or alternately, the text file and the program file can be stored in separate locations, particularly if the program file does not need to be altered to run a certain text file. For example, a Web browser running on a notebook computer with a wireless Internet connection can be used to view the document file through reference to the program file, where the conjoined text and program files can be accessed via the reader's typing in the Web address of the conjoined document (the text file as this is embedded within the program file) in a browser task bar.

The authoring process can include delimiting the content such that further action is required by the viewer to access the second version of the document file. As previously discussed, this action can include the use of an action key. The viewer will be able to display a portion of the complete document file, but subsequent viewing of delimited content will require additional action as specified by the author.

The authoring process can include delimiting content for placement of interleaved content, which interleaved content can be displayed after viewer action. For example, interleaved pages including annotation content on interleaved pages can be presented in a second version of a document after a viewer has read the first version, according to the designs of the author as he or she created the document file. This second version will be presented only after the viewer has pressed a "back-to-the-beginning" action key to return to the beginning of the document and view the second version of the document, or it will be presented to the viewer automatically, when the viewer passes a point or points in the document as determined by the author, these designated by author using a certain delimiter, for example a "^^||" delimiter. The second version will comprise the first version of the document, but now between its pages there will be the interleaves including annotation material as designated by the author.

Thus, the authoring process includes creating content and delimiting it so that presentation of interleaved content is controlled either automatically or by the viewer through activating an action key. The capability to author a document in this manner can be provided by any word processing program. This document, now in the sense of a "document file," can be stored on a medium such as a portable memory device or a hard drive internal to a computer, or as instructions resident temporarily in RAM. The stored instructions can be implemented by a microprocessor device through reference to an unchanging or modestly modifiable program file, which will be combined with the document file or will be stored separately and cause a document to be displayed on an electronic device. Although in the exemplary implementation of the invention, the text file will be written in ordinary HTML or XHTML code, the program file preferably will be written in JavaScript. Multi-page documents including interleaved versions will be presented as single web pages in an ordinary web browser. Text file code can be accessible to viewers, allowing them to modify their copy of the text file in the sense of adding their comments to their own copies.

Text for presentation according to the invention can be created by modifying previously-authored plain-text documents. Such plain-text documents are divided into strings, each string representing a single page or other predefined unit. Strings are marked up in a markup language, such as HTML, and delimiters are added. The resulting text file is inserted into the program, to be acted on by a program file that is also present in the document file.

An author can make simple modifications to the program file to adapt it to a particular text file. For example, he or she can increase the number of specifically targeted "back" keys and their targets' location, or change the number of strings skipped over when the original text is read. "Back" keys may also redirect the reading frame ahead, the name notwithstanding.

It is also contemplated that the invention can be embodied as an integrated device that includes the storage medium described above, as well as a microprocessor device and an electronic display device. The integrated device can include an action key in communication with the microprocessor device for initiating viewer action.

Although the invention has been described to this point in terms of viewing versions of a complete document, it is contemplated that a document can be divided, such as into chapters, and that the chapters or other components can be serialized individually, in order or otherwise, each component having one or more interleaved versions that can be presented to a viewer. For example, a sequence of strings, each representing an individual page in the document, can be written in such a way as to cause a table of contents to appear after a number of strings has been viewed, which table of contents will be hyperlinked so the process can resume in the selected document. With or without hyperlinks, an ensuing document can be indefinitely long and can resemble a magazine, newspaper, or book, with any number of pages and any number of articles or chapters. "Chapter jump forward," "chapter jump back," and "jump screen behind" features, or other non-sequential access features, can also be provided through modification of the program file. Tables of contents can comprise simple hyperlinked lists, or they can be geometrically more complex shapes, including graphics, digital photographs, and text, created, for example, using HTML's "table" or Cascading Style Sheets "DIV" functions, preferably hyperlinked. "Advertisement boxes," possibly hyperlinked to Web pages and possibly authored according to the method of this invention, can also appear on table of contents pages, or anywhere else in the document, including between pages of otherwise-continuous narrative text.

Other embodiments of the invention can relate to the tracking of content consumed by the viewer, and to charging a fee for content consumed by a viewer. For example, when an action key is depressed by the viewer as described above or when a "page back" key is pressed, an incremental charge can be incurred, to be debited from a pre-paid account or to be charged at a later time. This charge can be incurred in response to every depression of the action key, forward or backward, or per a predetermined multiple number of depressions, or according to any scheme devised by the author and implemented as a revision in the program file. If desired, charges can increment as the viewer moves forward through the document, irrespective of action-key depression, depending for example on the reader's passing the end of strings, or passing "delay" delimiters. Thus, interleaved pages can be presented to a viewer individually, with the understanding that a set fee or a variable fee, as determined by another delimiter, will be paid for each accessed interleaved page. The invention can be used to track usage and charge the viewer accordingly.

Alternatively, a special delimiter can be added to the textual content of non-interleaf pages such that the act of "passing" the delimiter by the viewer automatically results in an incremental charge to the viewer. Such a delimiter might be, for example, "space-space-vertical pipe-number-space," where the number can be varied by the author and indicates the fee assessed for passing the delimiter in tenths of a dollar.

These or similar methods can permit an author to monitor any key depressions and/or forward or backward progression through content, and consumption of content in selectable portions, such as words, paragraphs, pages, etc. This consumption can be tracked and counted, and the viewer can be charged correspondingly. Alternatively, the resulting data can be used by an author, editor, or publisher to understand reader interests and habits better. Likewise, it can be used by the publisher of a periodical published under this method to determine staff writers' compensation, and to assist the publisher in fulfilling other functions specific to the role of publisher.

The content as seen by the viewer can include an indication of his or her current incurred charges, preferably at the reader's option. For example, a small window or other display region can be provided, in which is shown the total current charges incurred by the viewer. If a viewer is required to answer test questions as he or she proceeds through a document, his or her current score can appear in this window or other display. A resulting mathematical factor may be utilized by an author to determine a factor by which the viewer's per-delimiter fee or per-page fees will be multiplied, and this factor can also be shown. This display region can also inform the viewer when a charge delimiter has been reached or passed. Likewise, a document can be made to provide an indication, such as an audible indication, to the viewer whenever the total amount has been incremented, or will be incremented upon an action key's being pressed.

Off-line viewing of documents can also be permitted, with content consumption and associated charges determined only when the viewer next logs on to the content-provider's Web site. While off-line, through attending to their fee total, viewers can limit their consumption to remain within a preferred tolerance.

Thus, according to the invention, the author of a document can control the manner in which it is displayed to a reader. For example, an incomplete version, followed by a more complete version, followed by still more complete versions, some or all of which might be annotated, can be provided to the viewer in sequence, through the use of interleaved content. Advertisements can be included as at least a portion of the interleaved content of any version. Also, fee delimiters can be included within the interleaved pages and ordinary pages of a document in order that a publisher, author or editor, or later commenter can levy appropriate fees of viewers commensurate with their "intake" of the document. Code can be added to the program file of an electronic document, in order to prevent "malevolent users" from employing an action key or key combination in particular "prematurely," as a means of causing the CPU to pass over and not meaningfully read all fee delimiters encountered subsequently. This element of the invention allows viewers to be charged on a "by-consumption basis" not merely for use of interleaves but also for use of ordinary pages.

The present invention includes the method as described above. Within the scope of the invention, the method can be implemented as a computer program that can run on a computer or any device having a processor, including a dedicated reading device. The program can be loaded onto the computer directly, or can be implemented over the Internet or any other network. The invention can also be embodied as a non-transient storage medium on which are stored instructions that can be interpreted by a processor to cause a computer or other device to perform actions according to the described method, as described above.

The invention can also be embodied as a computer or other device on which the method is performed. For example, a general-purpose computer, including a processor, memory, one or more input devices, and a display of some sort, set up to view text as described herein, or set up on a network or as a stand-alone device and receiving documents authored according to the invention, is contemplated as falling within the scope of the invention. A special-purpose device dedicated to reading documents authored according to the invention is likewise contemplated. For example, document files can be loaded onto and stored on a portable memory medium that can be attached to and read by such a special-purpose device, or document files can be downloaded onto such device via a network or directly from another computer or other electronic device. Such a special-purpose "reader" will preferably be portable and will present documents to a viewer. Such a device can be functionally simple, including a display, action keys, and a pointing device that can move a cursor to navigate the table of contents of a document being read. For example, a portable console having a suitable display can be provided with a touchpad pointing device and buttons, advantageously located for manipulation by a reader. The buttons can be used as the action key to move a document forward, as the action key to move a document backwards a page at a time, and as the action key to return the viewer to the beginning of a document, from which he can begin to view interleaved versions. In combination with the touch pad, action keys can be used to navigate a table of contents. For example, a portable console having a suitable display can be provided on its rear surface with a touchpad pointing device and a single button, advantageously located for manipulation use by the reader as the action key. Lateral movements made with the index finger of one hand on the touchpad device can be translated by the device into vertical movements through the table of contents.

It is also contemplated that more than one action key can be specified, or provided on a dedicated device. For example, the left-arrow key on a typical keyboard can be designated to be used by the viewer to drive the presentation backwards a page at a time. For example, using this key, a bit of content can be viewed more than once. Likewise, the right-arrow key on a typical keyboard, through being pressed by a viewer continuously, can be designated to be used by the viewer to return the document to the point where the viewer had left off, regardless of how many times the left-arrow key and/or the Enter (action) key had been used in the intervening time. Up-arrow and down-arrow keys can be used by the reader to navigate a page longer than a single screen. If a special-purpose device is created dedicated to reading documents authored according to the invention, right-arrow, up-arrow, and down-arrow keys may be added to the rear surface for use by the reader. Alternately, all four keys may be placed on the front of the device, or the screen itself may be utilized as a sensitive touch device, preferably without visual designation of the specific areas of sensitivity.

Thus, it is apparent that the invention provides a number of advantages over static text as it is presented in printed books and magazines and in "eBooks."

Furthermore, whereas eBooks and multipage commercial word-processor documents such as those generated in Microsoft® Word®, Microsoft® PowerPoint®, and Adobe® Acrobat®, necessitate transmission by fast-speed Internet connections because of their large file sizes, moderately long articles authored according to this method, if they employ only text, can have file-sizes of only a few tens of kilobytes, allowing even long articles and books to be downloaded quickly, regardless of whether users are restricted to using a "pre-modern" Internet connection, such as a slow dial-up connection.

The following is a non-limiting example of content provided to a viewer according to the invention. A document is provided to a user as a Javascript and HTML file, preferably as an email attachment or as a direct download either to a portable device such as a laptop, smartphone, or tablet computer, or to a non-portable electronic device such as a desktop computer. Once the file is opened in a Web browser, it is presented to the viewer as a series of pages, which each can contain any combination of text and media content. Each page can be sized to be viewed on a single screen of the viewer's device, or can be scrollable. If according to author's wishes, during presentation of a document the current page does not automatically progress to the next page, then when the viewer has finished consuming the content on a current page, he or she actuates a predetermined key to move on to the next page. For example, pressing the right-arrow key on a viewer's computer keyboard or dedicated reader keypad can advance the content to the next page. Of course, touching the right-arrow zone on a touchscreen of a touchscreen-enabled device would have the same effect.

According to the invention, it is possible that the next page will deviate only infinitesimally from the prior one, for example only in the coloring or font style, bolding, italicization, underlining, or highlighting of a single word, or can deviate more markedly from it, through, for example, the addition of a commenting text box or boxes; or the two pages can be entirely different from each another, or can be no different from one another whatsoever.

Once the viewer has consumed all content in the current version of the document, or has consumed all desired content up to a certain point in the document, or again if the viewer simply decides at some point, for arbitrary or non-arbitrary reasons, to switch to reading original pages together with their respective interleaves sequentially on first exposure—assuming that this option is allowed viewers by the author of a document—he or she can summon the second version, again by pressing the appropriate targeted key. For example, by pressing the left-arrow key the viewer can return the document to the first page, or any other target page—whether an original page or an interleaf page, including pages beyond the last page viewed by a user at this point—according to the desires and direction of the author. Subsequent pressing of the right-arrow key will then advance the viewer through the second version of the document, yet this time interleaved pages or sections associated with the second version will also be viewable. These can include advertisements. The process is repeated and, at the option of the publisher, a third version and associated interleaves can be provided to the viewer. Prior to providing each version, payment authorization can be required of the viewer. This payment can be made at the time the next version is requested, such as by debiting a pre-paid account belonging to the viewer.

From an authoring standpoint, if the first string of the document is chosen by the author as the target, the left-arrow function can be programmed to reset the string counter to 1, thus returning the viewer to the first page, the utilization of other targets necessitating the resetting of the string counter to other numerals, of course. Additionally, the right-arrow function can be programmed to increment the string counter by an integer larger than 1 while the first version of the document is displayed, so that interleaved pages will be skipped.

Alternative Embodiments

In alternative embodiments of the invention, pre-leaves and post-leaves, rather than or in addition to interleaves, can be included in the document file.

Figure 2:
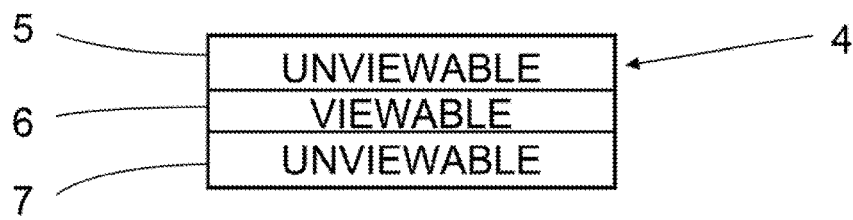
FIG. 2 is a block diagram of an exemplary embodiment of content.
Figure 3:
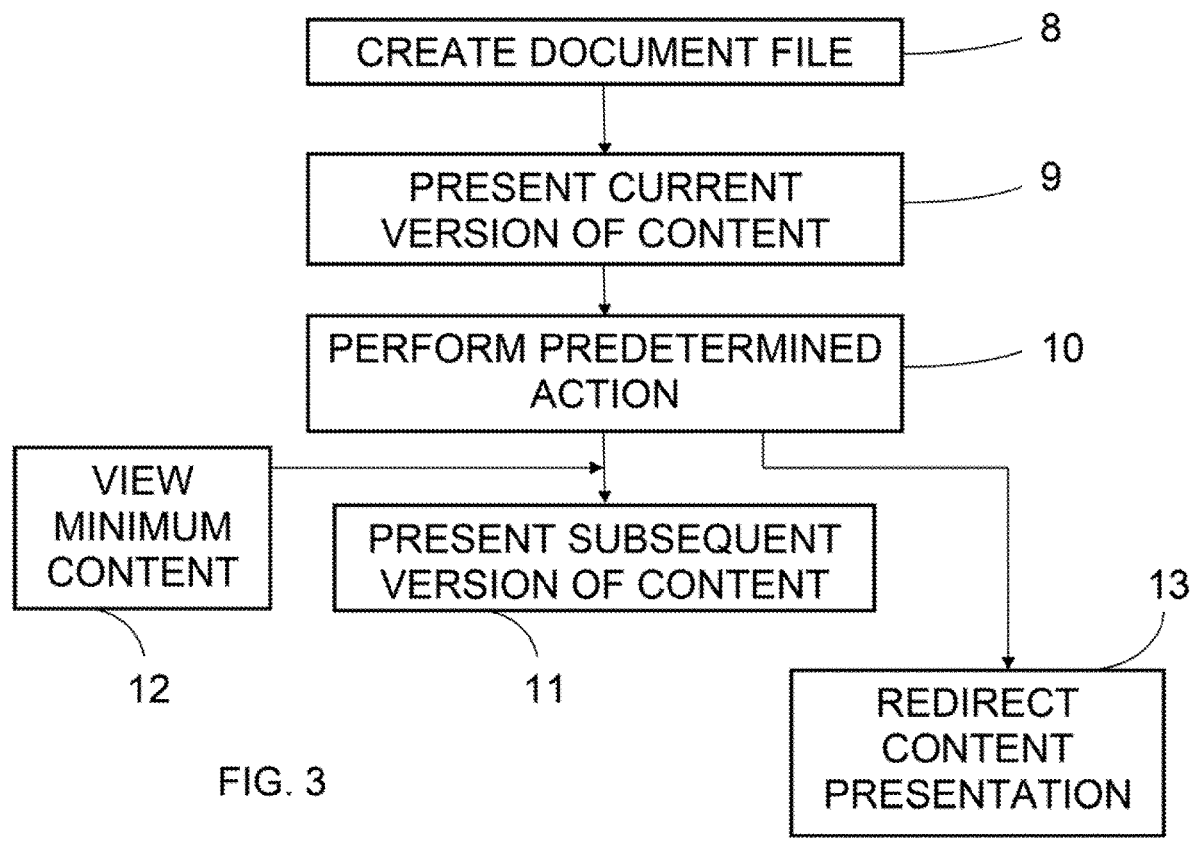
FIG. 3 is a flow diagram that shows an exemplary general process of the invention.

As shown in FIG. 3, such a method includes creating a document file 8, which includes a text file portion 2 and a program file portion 3 (FIG. 1). The document file is a variable computer-readable file that includes content. When the document file is opened, the content is presented to a user on an electronic display device, in discrete units according to a controlled sequence. As shown in FIG. 2, the content includes viewable content 6 and unviewable content 5, 7. In the example shown, some unviewable content 5 precedes the viewable content 6 in sequence, whereas other unviewable content 7 follows the viewable content in sequence, although the sequencing of viewable and unviewable content units can be configured any manner according to the invention, as is apparent to one of skill in the art.

According to the exemplary embodiment shown, a current version of the content is presented 9. In this current version, fewer than all of the units of the content are viewable by the user, that is, only currently viewable units of content are viewable by the user. The unviewable units of content preceding and following the viewable units of content cannot be seen by the user when the current version of the content is being viewed. The user views the viewable units of content, which advance unit-by-unit through a predetermined sequence, either automatically or by action of the user.

At some point, a subsequent version of the content is presented to the user, again either automatically or by action of the user 11. According to this exemplary embodiment, the user performs a predetermined action 10, in response to which the subsequent version of the content is presented 11. The subsequent version of the content varies from the current version in some respect. In this example, at least some of the units of content that were unviewable in the current version of the content are viewable in the subsequent version of the content. This subsequent version of the content might be the final version, or further subsequent versions of the content can be presented to the user in this manner, each of which can vary from the previously-viewed version in some respect. The previously-unviewable content can be additional text, such as explanatory text or text that is revealing in some way and that completes or extends the content that was previously viewed. Alternatively, the previously-unviewable content can be annotation content, commentary, bibliographical information, advertising content, or any other content that is subsequently added to the current content, as part of one or more subsequent versions.

Thus, the user reads the current version of the content until such time as he or she is presented with the subsequent, different version of the content, in this case when the predetermined action is performed by the user. In response to performance of the predetermined action, presentation of the content can also be redirected to a different unit of content 13. For example, presentation of the content can be returned to a previous unit of the content, such as the first unit of content viewed by the user. Alternatively, the different unit of content can be a unit of content that was previously unviewable, such as content prior to the beginning of the viewable content in the previous version.

As mentioned above, the subsequent version of the content can be presented automatically, or in response to a predetermined action performed by the user. However, conditions can be implemented regarding when performance of the predetermined action will lead to presentation of the subsequent version. For example, to ensure that the user reads a sufficient amount of the current content before moving on to the subsequent version, use of the predetermined action to cause presentation of the subsequent version can be conditioned such that the subsequent version is not presented on performance of the predetermined action unless a minimum predetermined number of units of content have been viewed 12 by the user prior to performance of the predetermined action. This enables the author of the document to prevent a user from jumping ahead to the subsequent version prematurely, before having read (and purchased) sufficient current content.

Figure 4:
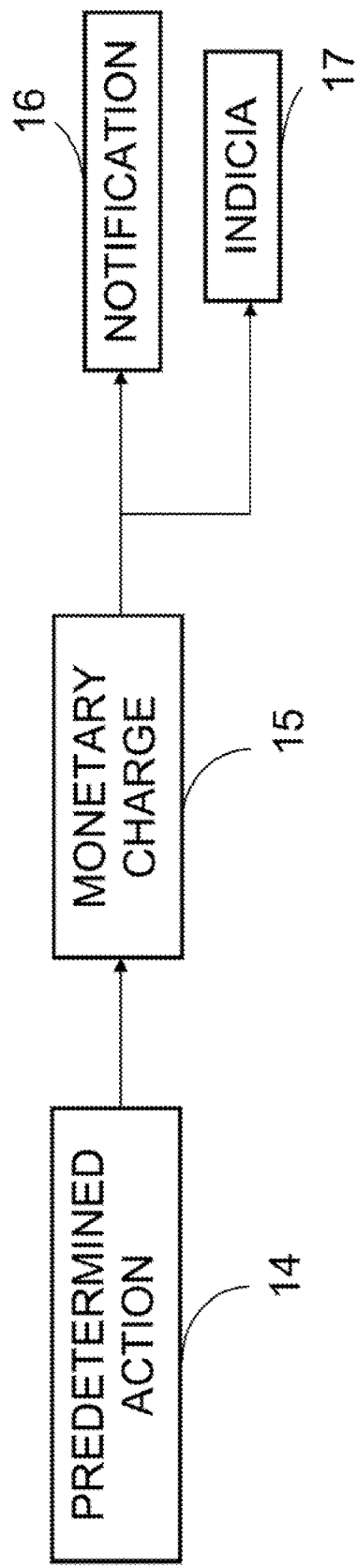
FIG. 4 is a flow diagram that shows a particular exemplary aspect of the monetary charge process of the invention.

As shown in FIG. 4, the author and/or publisher of the document file can charge a fee for consumption of the content by the user by assessing a monetary charge 15, for example, for every consumed unit of content, or for every performance of the predetermined action 14 or other designated event. A notification 16 can be provided to the user each time the charge is increased, or is about to be increased, and indicia 17 can be provided to the user showing the total monetary charge incurred during a session. The charge amount can represent an amount that the user will be required to pay, or an amount that will be deducted from a pre-paid account established by the user with the publisher.

Figure 5:
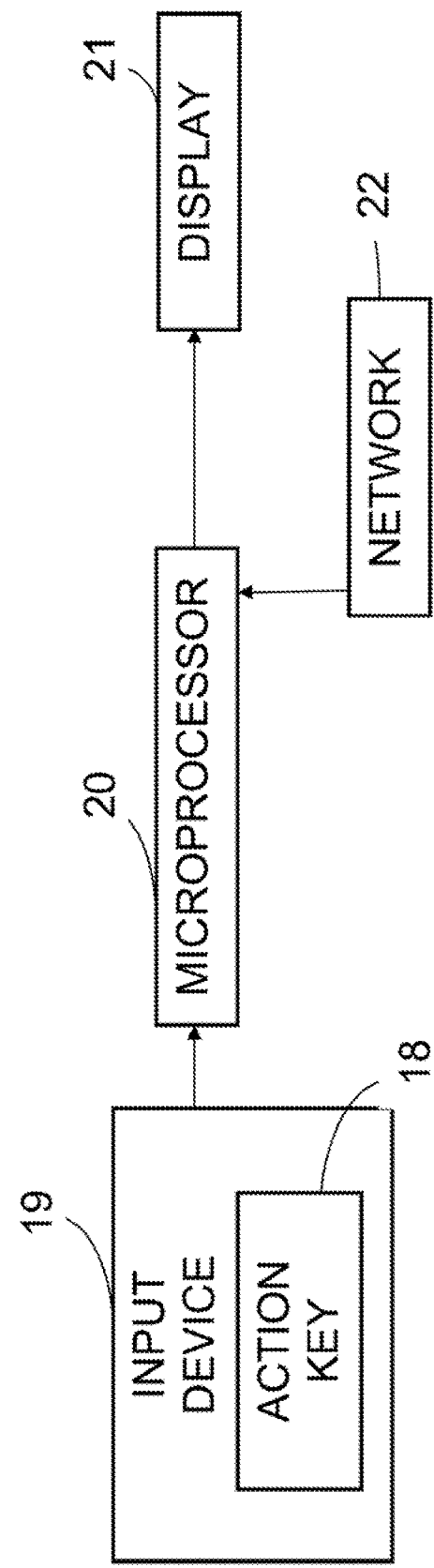
FIG. 5 is a block diagram of an exemplary integrated device according to the invention.

The predetermined action mentioned above can be any action designated by the publisher that is able to be performed on the user's viewing platform. As shown in FIG. 5, if the content is to be presented and viewed on a conventional computer or other typical microprocessor device 20 that is in communication with the electronic display device 21 and which can be connected for communication via a network 22, the predetermined action can be the depression of a keyboard key 18, combination of keys, or series of keys, for example. If the content is viewed on a dedicated viewing device, such as a device specifically designed to view content provided by the publisher or by publishers providing content according to the method of the invention, the designated action can be movement of an action key 18 on an input device 19, which can be designated specifically for this purpose. It is contemplated that any input action apparent to one of skill in the art can function as the predetermined action.

The predetermined action can also be interactive. For example, as shown in FIG. 6, after consuming a certain predetermined amount of current content 23, the user can be presented with a query 24, such as one or more questions related to the substance of content consumed to that point, to which the user must provide an answer 25. The predetermined action would be the correct response to a question, or to a great enough percentage of a number of questions. If this requirement is satisfied, the subsequent content is presented to the use 26. If this requirement is not satisfied, the action is not deemed to have been performed, and the subsequent version (for example, a version in which unviewable content following the end of the current content becomes viewable) is not provided to the user. If the requirement is not satisfied, subsequent versions of the content can be forever denied to the user, as an example of a harsh consequence. Alternatively, the user may be offered an opportunity to answer the questions again, to answer related but different questions, or to re-consume the content on which the questions are based before being given a new opportunity to respond to the query.

The content itself can include, but does not necessarily include, text. The content can also include still images, animation, audio content, or any type of media or data that can be experienced by a user, and the term "view" as used herein is intended to encompass any such receiving experience by a user. Thus, the document file can be, for example, a plaintext file, an HTML file, and/or an XHTML file, and the content can also include at least one data tag, which can include formatting tags, hyperlink tags, image source tags, sound source tags, video source tags, table tags, form tags, frame tags, style tags, div tags, class tags, embed tags, object elements, JavaScript, Java applets, Flash units, and/or HTML5 units. The units by which the content is measured can be designated by the publisher to be of any size. For example, a unit can be designated to be a line of text, a sentence of text, a paragraph of text, a chapter of mixed-media content, a string of data, or any other measurable quantity of content, text or otherwise. A "page" of text, defined by the screen of the electronic display device on which the content is viewed, is another example of what can be designated as a unit of content. If the content is provided via a network interface and is viewed by the user in a browser window, that window can also be used to define the unit size.

As shown in FIG. 7, if the document includes a textual portion, one or more delimiters can be inserted 27 at a selected position(s) of the textual portion to define delimited content. For example, at a selected position, the textual portion can be occupied by a particular character combination that includes a delimiter. When the delimiter is reached 30 as the user consumes units of content 29, advancement of content can be caused to stop 32 until further action is taken by the user. Alternatively, presentation of content can be paused 31 for a selectable, discrete number of time units, and/or presentation of the document file can be automatically redirected 33 to a different location in the document file on reaching the delimiter.

Further, predetermined events and/or actions can be tracked 28 that occur while the user consumes units of content. For example, a number of delimiters passed by the user while viewing units of content, and/or a number of units of content passed by the user while viewing, can be tracked and counted 34. More than one type of delimiter can be used, in which case tracking the delimiters can include separately tracking the delimiters of each type or of one particular type. The number of units of content passed by the user while viewing can be tracked by tracking actions performed by the user that cause a subsequent unit of content to be presented, or by automatically tracking the end of a current presented unit of content for which there is no stop delimiter. In this way, consumption by the user of content can be tracked in order to determine the user's consumption data, for purposes of interest to the publisher.

For example, a monetary charge 35 can be associated with the tracked number of delimiters passed by the user, the tracked number of units of content passed by the user while viewing, movement of the action key, or any other tracked behavior. For example, each time a delimiter is passed by the user, or each time the number of units of content is passed while viewing, a total monetary charge can be increased. If the tracked unit of content is a string, a string counter can be incremented to track the number of units of content passed by the user while viewing, and the associated monetary charge is increased whenever the string counter is incremented.

A particular fee delimiter 36 can be designated separately from other delimiters, so that the monetary charge is associated with the tracked number of fee delimiters passed by the user can be used to increase the monetary charge rather than the tracked number of units of content consumed. This fee delimiter can be variable 37 in such a way as to make the associated monetary charge variable, for flexibility in charging a user for consuming content. In order to provide discounts or to otherwise provide a different fee schedule for different users consuming the same content, the instantaneous monetary charge and/or a cumulative monetary charge for the user can be multiplied by a user-associated factor 38. The user-associated factor can be determined by, for example, the user's reaching content-consumption goals, or the user's performance of a task, such as a task related to answering questions regarding substance of the content.

Figure 8:
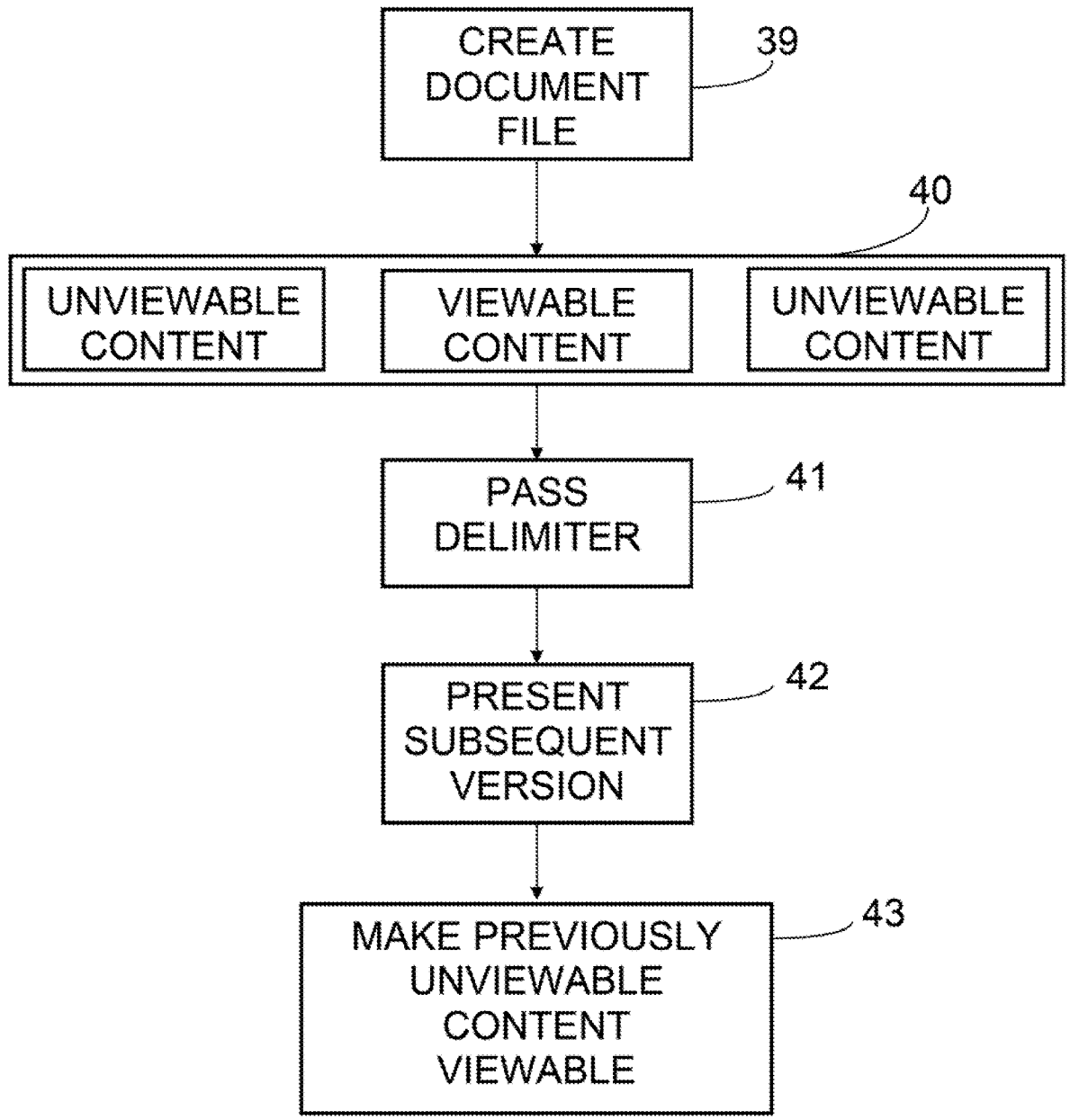

As shown in FIG. 8, the method of governing content presentation according to the invention can provide unviewable content to the user automatically, without user intervention. In this case, an author creates 39 the document file, and the author or publisher inserts at least one delimiter at a selected position(s) of the document file. Fewer than all of the units of this content are viewable by the user in a version of the content currently presented to the user. For example, unviewable units of content can be disposed 40 prior to the units of viewable content and/or after the units of viewable content. Units of content are viewed sequentially by the user. A subsequent version of the content is presented 42 to the user in response to passing 41 the delimiter by the user while consuming content. Now, at least some of the unviewable units of content in the previous version of the content are viewable 43 in the subsequent version of the content. Thus, presentation of the content from the current version to the subsequent version takes place automatically when the user passes 41 a delimiter while consuming the content. As a result, previously unviewable content becomes 43 viewable.

Cases in which subsequent versions of content are provided to the user on performance of an action or passing of a delimiter have been described. It should be noted, however, that these are not the only modes of advancing to a subsequent version contemplated to be within the scope of the invention, and the invention is not limited to these particular implementations. For example, a subsequent version of the content can be presented both without the user passing a delimiter and without the user striking an action key, particularly when the string that is being read changes, for example, where there is no stop delimiter in the document file.

Figure 9:
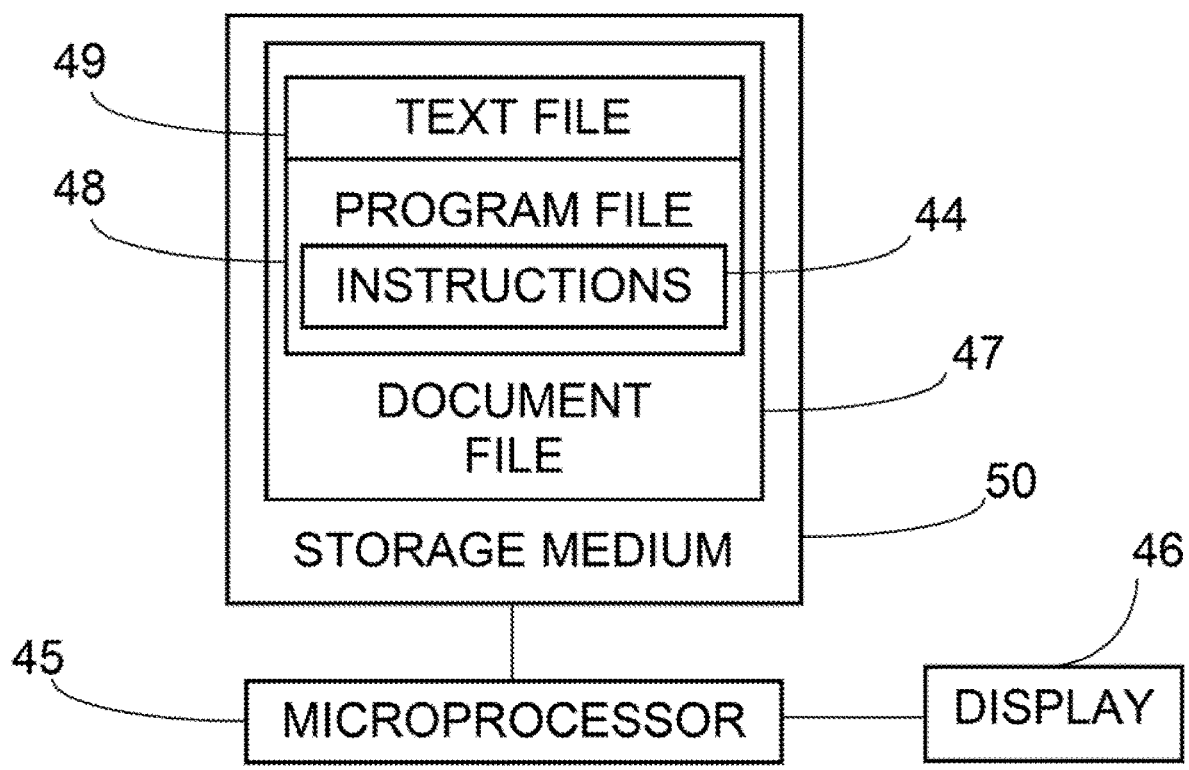
FIG. 9 is a block diagram of an exemplary integrated device according to the invention.
Figure 10:
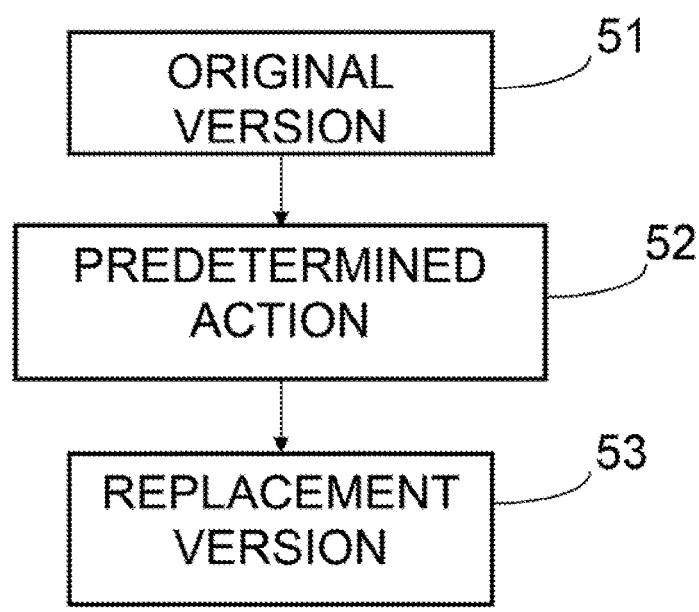
FIG. 10 is a flow diagram that shows an exemplary general process of the invention.

Presentation of the content to the user need not be restricted to revealing previously unviewable content to the user in subsequent version(s) by adding these to the current version of the content. Instead, for example, the content can be presented to the user in two or more discrete versions in controlled sequence, as shown in FIG. 10. An original or current version of the content, in which units of the content are currently viewable by the user, is presented 51. The user performs a predetermined action 52. In response to performance of the predetermined action, a subsequent version of the content is presented 53. At least one unit of content that is viewable in the current version of the content is not viewable in the subsequent version of the content, and/or at least one unit of content that is not viewable in the current version of the content is viewable in the subsequent version of the content. Thus, on performance of the action by the user, a complete replacement version of the content is presented for consumption, in which at least some units of the content are added, removed, or otherwise different from the previous version As shown in FIG. 9, the invention can be embodied as an integrated device that includes a storage medium 50, a microprocessor device 45, and an electronic display device 46. The storage medium 50 includes intransient instructions 44 in the program file portion 48 of the variable computer-readable document file 47. The instructions 44 can be implemented by the microprocessor device 45 to cause content to be presented to the user on the electronic display device 46 according to the instructions 44. The instructions 44 in the program file 48 allow the author to create variable computer-readable content as a text file portion 49 of the document file 47, for presentation on the electronic display device 46. The text file portion 9 includes viewable content and unviewable content, presentable to the user as otherwise described herein. The instructions 44 included in the program file 48 are a computer-readable instructions that are largely unvarying and include previously programmed computer code allowing the document file 47 to be executed.

Figure 11:
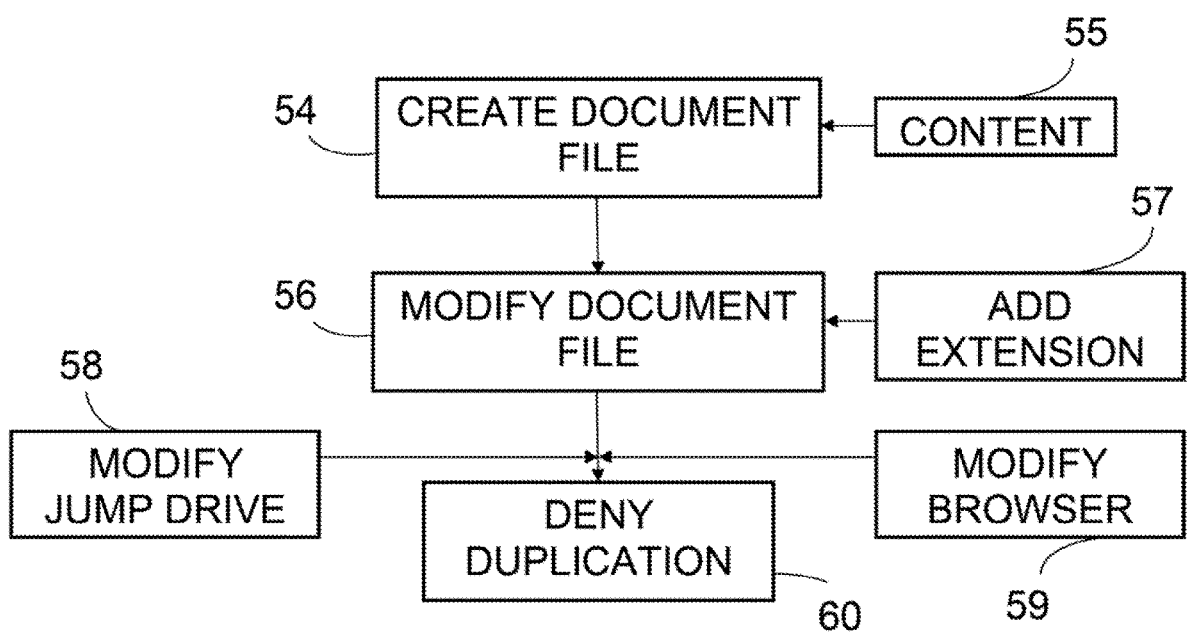
FIGS. 11 and 12 are flow diagrams that show exemplary general duplication-prevention processes of the invention.

The present invention also encompasses methods of restricting or controlling the duplication, altering, and dissemination of document files. As shown in FIG. 11, prevention of unauthorized modification of a document file can also be provided when creating 54 the document file. As mentioned previously, the document file is a variable computer-readable file that includes content 55 for presentation to a user. A browser 59 that acts as an interface used to present the content, a jump drive operating system 58 for a jump drive, thumb drive, or other portable drive on which the document file can be stored, and/or the document file 56 can be modified as part of a duplication-prevention process. Modifying the jump drive operating system, for example, can include restricting the jump drive operating system such that modified document files stored on the modified jump drive cannot be opened by other than the modified browser. The modifications to the document file, the jump drive, and/or the browser can conjointly render the modified document file unable to be duplicated 60.

Figure 12:
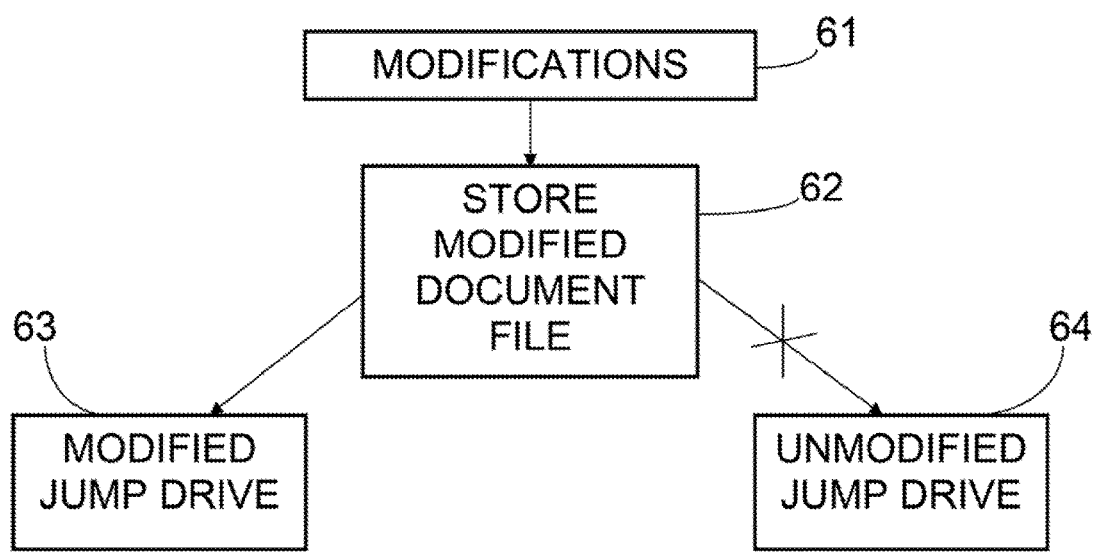
Figure 13:
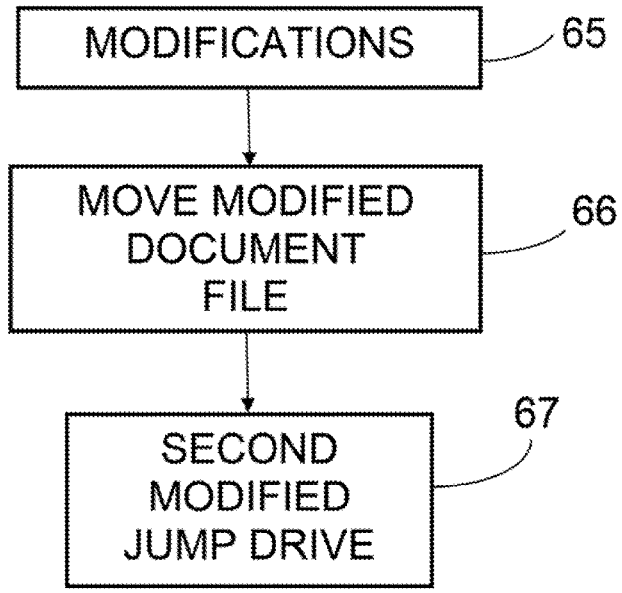
FIGS. 13 and 14 are flow diagrams that show particular exemplary aspect of the copy process of the invention.
Figure 14:
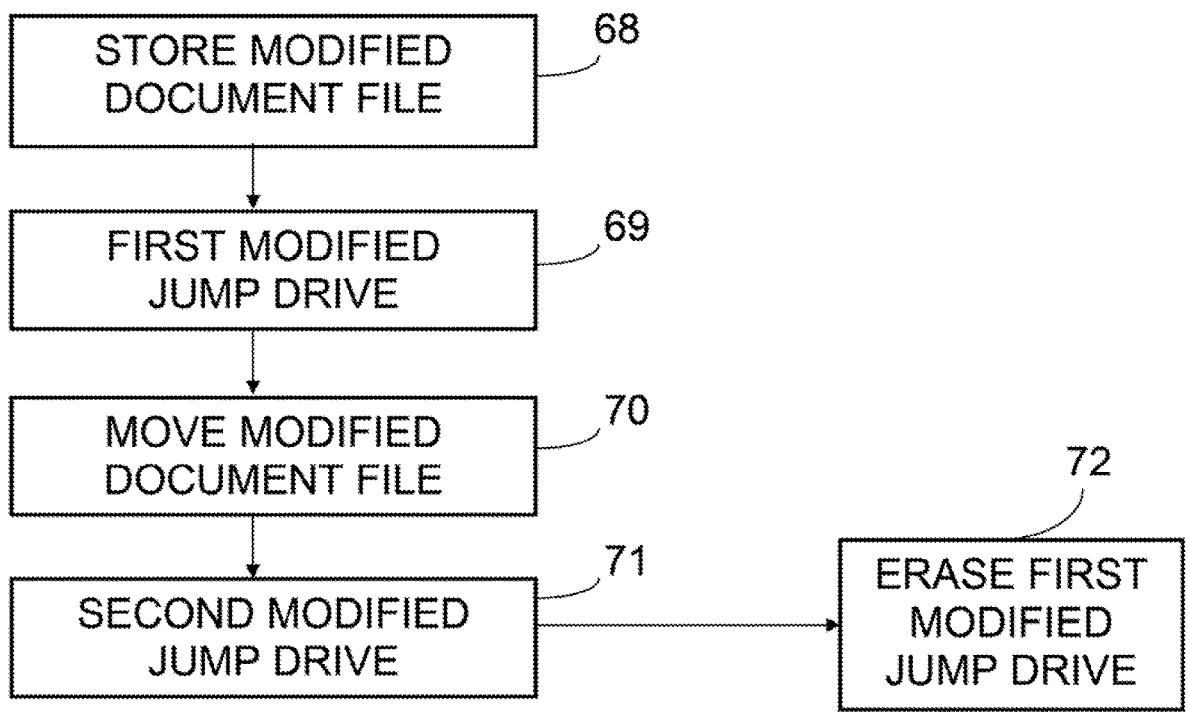

For example, the document file can be modified to include a designated extension 57. As shown in FIG. 12, the designated extension and other modifications 61 render the modified document file unable to be stored 62 except on a modified jump drive 63, which is a jump drive including the modified jump drive operating system. The modified document file may not be stored on an unmodified jump drive 64, that is, a jump drive having a conventional, unmodified operating system. Other conditions can be imposed with respect to moving the modified document file. For example, as shown in FIG. 13, if the modified document file is currently stored on a first modified jump drive, the modified document file can be moved 66 to a second modified jump drive 67. However, the modifications 65 can conjointly render the modified document file able to be moved from this original storage location only if the modified document file is stored on a designated second modified jump drive, and not on an unmodified jump drive. As another example, as shown in FIG. 14, the modifications can conjointly render the modified document file able to be moved 70 from a first modified jump drive 69 on which it is stored 68 to a second modified jump drive 71 only if the modified document file is erased 72 from the first modified jump drive, and unable to be moved to a different modified jump drive otherwise. Thus, duplication and movement of the document file can be accomplished through modification of the document file and of the storage media on which the file is stored and the browser through which the file is opened.

Figure 15:
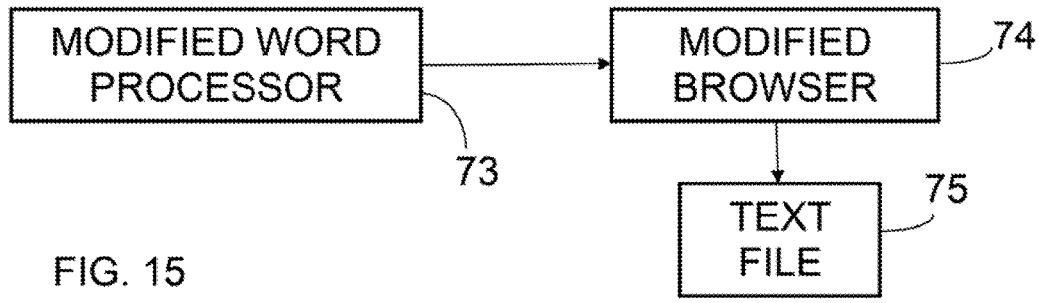
FIG. 15 is a flow diagram that shows a particular exemplary aspect of the authoring process of the invention.

However, it is possible for the modified document file document file, stored on the modified jump drive, to be altered by a user. The modifications can conjointly render the modified document file having the modified text file portion able to be stored only on the modified jump drive. As shown in FIG. 15, the modified document file can be altered by a user by copying only a text file portion 75 of the modified document file using a modified word processor 73 that is configured within the modified browser 74. The copied text file portion of the modified document file can be altered using the modified word processor, and the altered copied text file portion of the modified document file can be stored using the modified word processor by replacing the text file portion of the modified document file stored on the modified jump drive by the altered copied text file portion of the modified document file, and using the modified browser conjointly with the modified jump drive operating system to store the altered modified document file. In this case, the browser can be restricted such that it can only open a text file using the modified word processor. Thus, alteration of a document by a user is possible, but is restricted to alteration using a modified word processor, and storage of the altered document file is also restricted.

Figure 16:
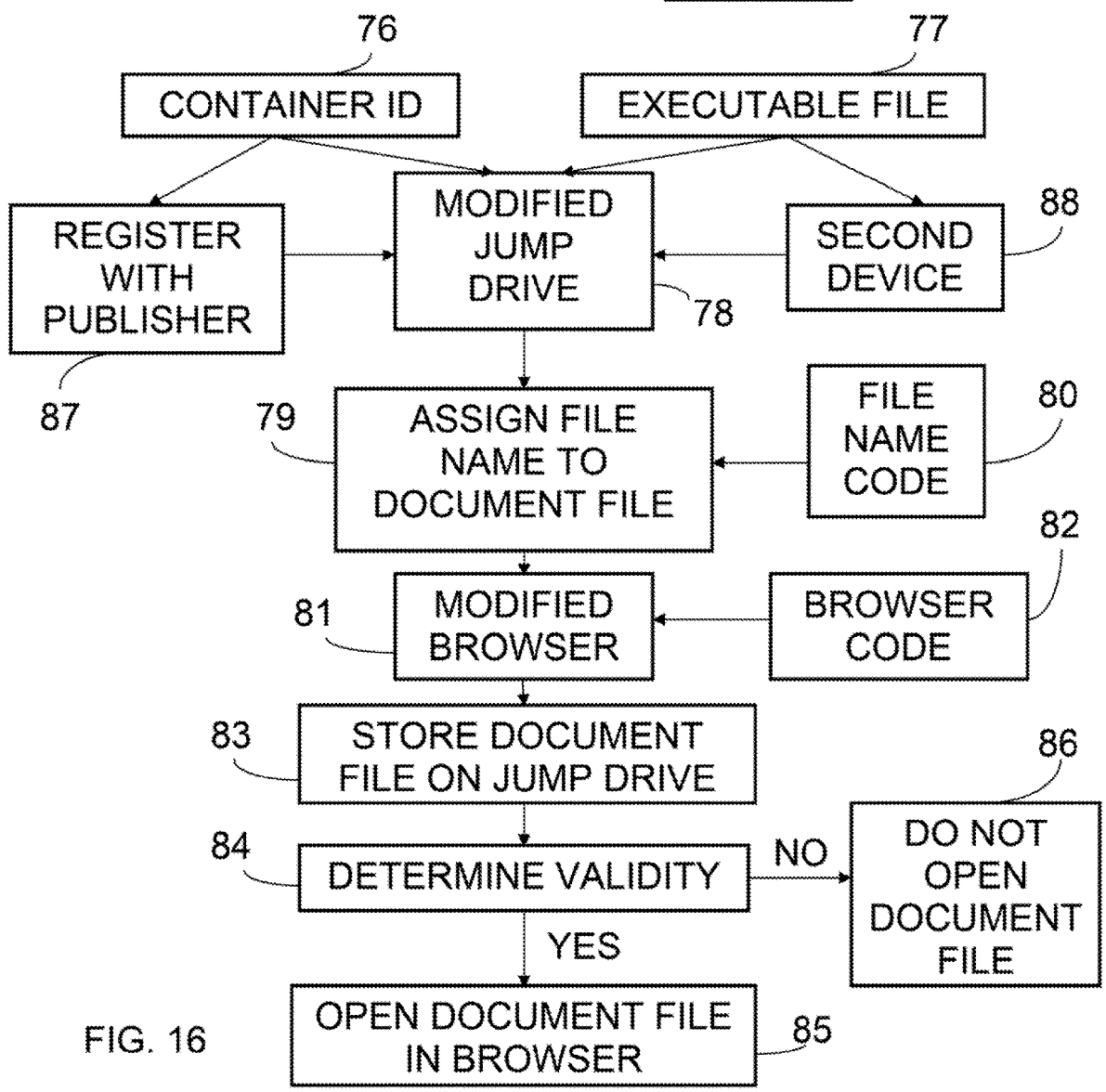
FIG. 16 is a flow diagram that shows an exemplary general process of the invention.
Figure 17:
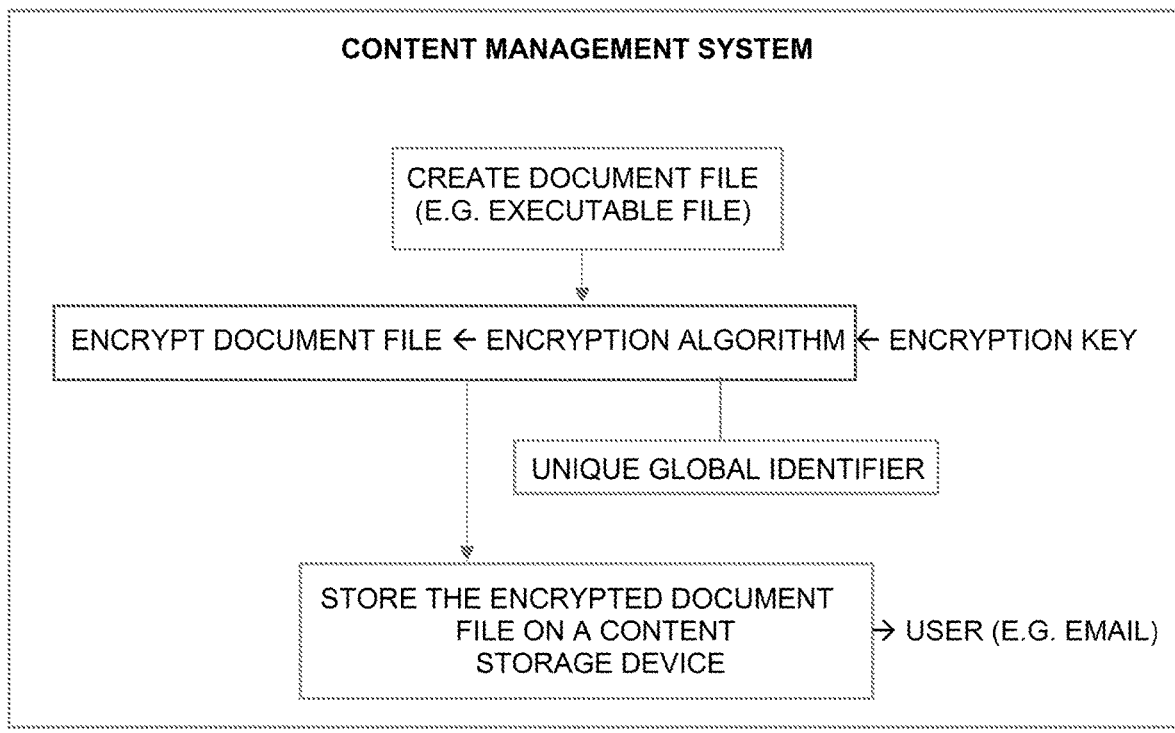
FIGS. 17-24 are flow diagrams showing aspects of an exemplary content management system according to the invention.
Figure 18:
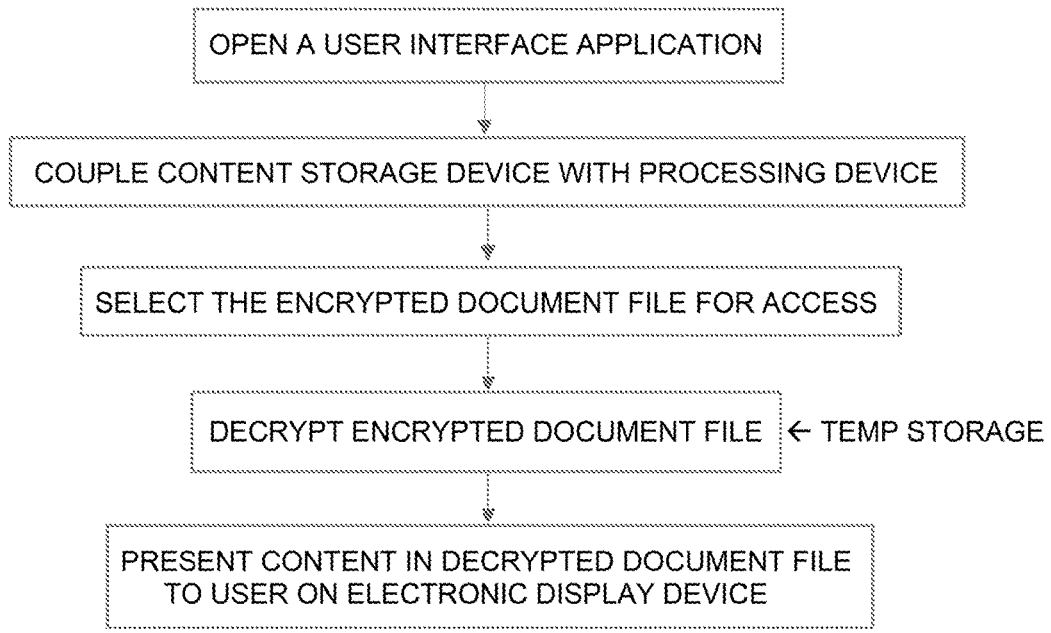
Figure 19:
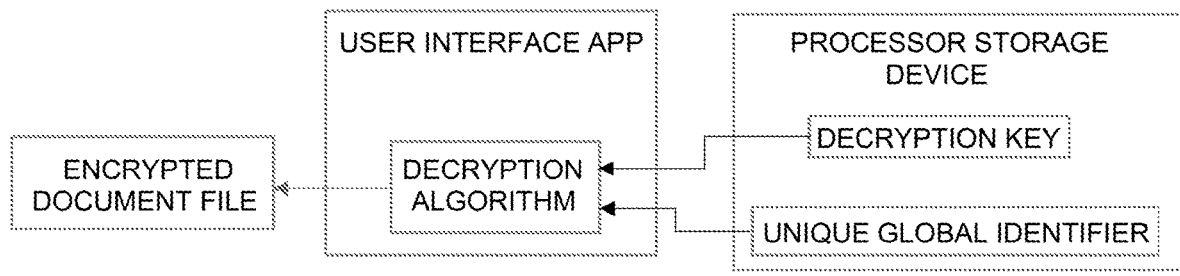
Figure 20:
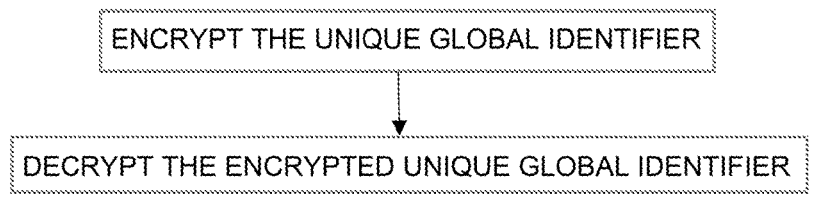
Figure 21:
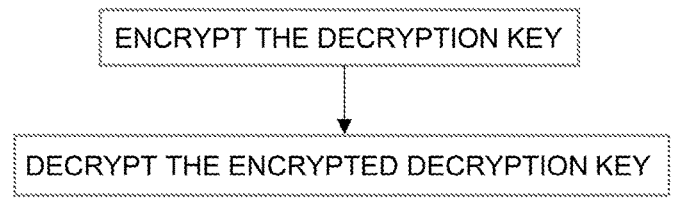
Figure 22:
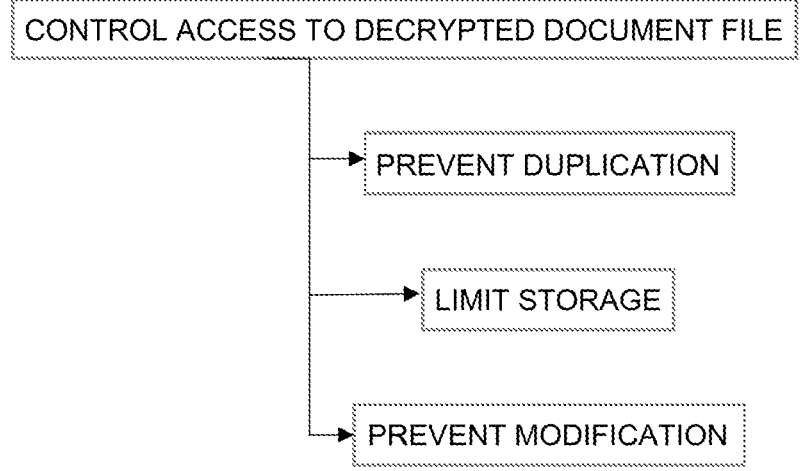
Figure 23:
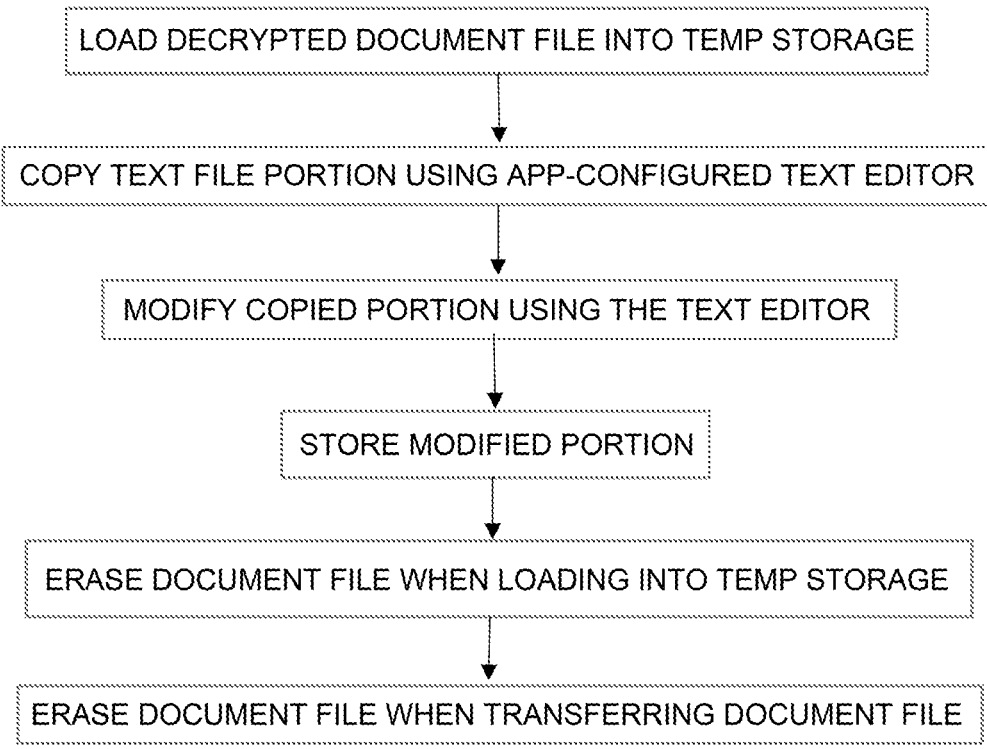
Figure 24:
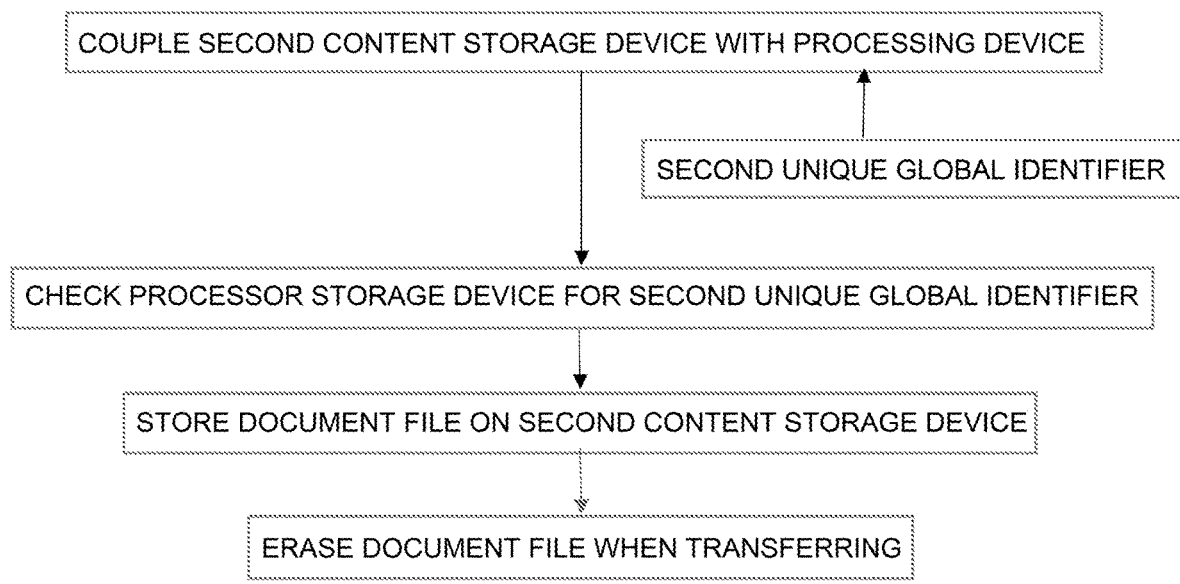

As shown in FIG. 16, a container ID 76 and an operating executable file 77 can be stored on a jump drive 78 associated with the modified jump drive operating system. A filename is assigned 79 to the modified document file in which the filename includes a designated filename code 80. A designated browser code 82 is assigned to the modified browser 81. The modified document file is stored 83 on the modified jump drive. An operating program associated with the operating executable file is used to determine if the filename code is valid, based on a predetermined criterion, and the operating program associated with the operating executable file is then used to determine if the browser code is valid, based on a predetermined criterion. A condition is applied such that opening the modified document file in a browser window by the modified browser 85 occurs only if the filename code and the browser code are both determined to be valid 84, and otherwise opening the modified document file is not allowed 86. The container ID is registered with the publisher 87. Thus, storage of the modified document file on any jump drive, whether modified or not, having an unregistered container ID can be prevented.

An executable file including the modified document file can be created at a first device and transferred from the first device to a receiving device. This receiving device can be a second device, or it can be the first device, such as when the first device is a node that is shared by two or more users. For example, the transfer of the executable file can be made via email, which can be received by a recipient at another device, or by another recipient at the same device, usually via a different user account than that used by the sender. The modified document file can be opened from the executable file only if the receiving device is communicatively connected to a jump drive having a registered container ID. If this is the case, the modified document file is stored on the jump drive having a registered container ID. Opening the modified document file if the receiving device is not communicatively connected to a jump drive having a registered container ID is thereby prevented.

According to another aspect of the invention, two or more sets of string functions, for example, a PAAT set and a PIIT set, or one PAAT set and several PIIT(n) sets—where (n) is an integer greater than 1—will govern presentation of successive series of strings. This embodiment is useful for several reasons. For example, a writer might not want to be compelled to present exactly the same number of interleaves between each pair of pages, as he might be under certain embodiments described above. In addition, a writer using this approach can employ multiple different interleaf sets to present highly complicated and involved ideas or facts to a reader serially and progressively—at increasing levels of detail and sophistication, and/or refinement of ideas and argument—in consecutively presented sets of interleaves. In addition, a writer may want to employ differing rules governing backward progression, such as one screen at a time, or all the way back to the beginning, in certain different separate series of strings. Utilizing two or more different string headers corresponding to separate string functions will provide the additional flexibility in implementation.

The invention can be implemented through certain modifications being made to an existing Web browser, to an existing jump drive operating program, and to documents as described herein such that these documents will bear their own unique extensions, such as ".N11," in place of the current ".htm" or ".html" extensions. When these modifications are made, documents authored according to the invention are playable only from and storable only to designated pieces of digital memory equipment, such as USB jump drives (memory stick, flash drive, thumb drive, etc.) or other hardware storage token, or in an alternate implementation, from and to the digital memory of particular computers and cell phones, for example. Likewise, when these innovations are implemented, various rigid and at this time-point unexpected and unusual restrictions can be placed upon viewers' use of electronic documents that they possess. And likewise, a fourth "fee delimiter" can be employed by authors, editors, publishers, and later commenters to assess fees of viewers "appropriately," more or less proportionately to the viewer's use of the document.

A conventional jump drive has its own unmodifiable and unique serial number imbedded in it, just as every computer has a MAC address. This serial number in a jump drive can be considered the "container ID." Assuming that a digital publisher issues unique jump drives for use according to this invention, which will hereinafter be referred to as "registered jump drives," such drives are manufactured with, in addition to the regular container ID embedded on them, a stored special operating executable file to run the drive. This modified operating .exe file will include an "examine-alphanumeric-code before .N11 file can be opened" function written into it. The possessor of such a drive cannot open, play, or reveal the source code of a document with an .N11 extension, except when this .N11 file is stored on a jump drive known by the publisher to be a registered jump drive. This restriction is made possible particularly because of the special nature of the new web browser, which can itself exclusively open, play, and show source code of .N11 files—this browser hereinafter referred to as the B-prime, or "B'," browser—in conjunction with other features of this invention.

A B' browser can be used for security reasons, for example, in order to prevent a file with an .N11 extension from being opened and played and from having its source code revealed by any browser, other than a B' browser, and except where this .N11 file was already stored on a registered jump drive. An existing browser can be modified in several ways, to become the B' browser. For example, it can be modified to permit the embedding of a unique code module, which may be an alphanumeric expression, at a designated location within its code. Further, it can be modified to "handicap" certain expected functions of a web browser, such as the "open" and "show source code" of a markup language's file functions, so that these will not be executed unless certain preconditions are met. In addition, the browser can be modified to be able to check, at the request of the B' browser itself, a continuously updated list (maintained by the publisher, for example in an online database) of registered jump drives that have been issued by the publisher, for the presence or absence of a particular container ID.

Thus, each .N11 file issued according to this method will be stored only on a registered jump drive—or alternatively, to devices of a different, yet comparable electronic storage medium type, including ones not yet marketed and/or ones utilizing technology not yet invented, including proprietary types—and will include in its file name a unique alphanumeric code issued by the publisher. A "check-alphanumeric-in-file name" function of the jump-drive operating program will determine if this filename code is valid. Then, assuming that the checked code is valid, a second function of the jump-drive operating program, a "check-alphanumeric-code-in-the-browser" function, will examine the code alphanumeric that is located in the B' browser program to determine if it is a valid B' browser. Only if both preconditions are met will this .N11 then be opened by the B' browser in a browser window.

When a file is opened in a B' browser window, a handicapped "show source" function of this browser can reveal the source code of the .N11 file, but only if the browser has determined that a registered jump drive is present in one of the peripheral slots (such as D:, E:, F:, G:) of the electronic device running the browser. To prevent a viewer from disabling security and payment features of .N11 documents, the content files and program files of .N11 documents can be made separable and the B' browser's "show source" function handicapped so that only content files and not also program files will be revealed.

The operating program of a registered jump drive will not allow the electronic device running the B' browser to store any document on this drive unless the file has an .N11 file extension, and it will not permit storing of any .N11 file, including any .N11 files that have been altered by a user, for example, to include his own "marginal notes," except on a drive whereupon an .N11 file with the same name is already present, and then only by overwriting this existing .N11 file. To stress and emphasize, the storing of documents by a viewer on internal computer memory media, or on external electronic memory media other than the registered jump drives here discussed—yet excepting devices that are similar to jump drives, where the publisher deems these to be "more advantageous" from its vantage point than jump drives—will be blocked by the publisher according to the invention.

Copies of the B' browser are each assigned an alphanumeric code at the time of their installation on an electronic device. Such copies of the browser will be made available to users, for example by free download from the publisher's website. This browser will be programmed in a computer language that can be compiled into an executable file. Because this code will be compiled, it will be difficult or impossible to fraudulently reverse engineer, including by the inclusion of a fraudulently created browser alphanumeric code. Preferably, the algorithm used to generate alphanumeric codes, and concomitantly to determine whether alphanumeric codes that appear in .exe file names, .N11 file names, or individual copies of the B' browser are "valid," will be kept outside the public domain. Thus, efforts to fraudulently distribute electronic reading material in order to bypass the correct assessment of fees by a publisher will to an extent be frustrated.

According to this embodiment, individual copies of electronic books, pamphlets, articles, and other materials in electronic form will be available directly from the publisher's website after payment of a variable "maximum use fee" by each user. For example, a user wishing to obtain an electronic book or other materials will go to the publisher's website and log on there by providing his email address or other identifier and subsequently a payment method, for example, credit card account details. After log-on and provision of a payment method, users will be directed to separate web pages where a publication list is located. This list will indicate each item for sale, for example, at least by its title and maximum user fee. The maximum user fee will be variable, from free to any fixed maximum amount, at the publisher's discretion.

When the user has identified an item that he wishes to procure, he will obtain it by selecting the item name, which will be a hyperlink, and then in a separate screen, by selecting a radio button to confirm his purchase, thereby paying the listed amount and receiving an email message having the selected item sent as an attachment. This attachment will be written as an .exe file so that it will not exactly comprise the document representing the electronic book or other item. Therefore, it will not exclusively consist of the respective .N11 file that is to be played in a B' browser after storage on a registered jump drive. Rather, the attachment will "embrace" the .N11 file, allowing it to be opened and the document contents immediately to be transferred to and stored on a registered jump drive, after certain preconditions have been determined to have been met. If out of security concerns, .exe files are not allowed to be opened directly from email attachments by, for example, antivirus software, corporate security policy implementations, or electronic-device operating platform measures, a storage step or other intermediate action will be performed.

Each published item purchased from a publisher's website will be assigned, at the moment of its creation by the publisher's website program, a suitable alphanumeric code that will be present in the file name of the .exe attachment. When the user opens this .exe from within his email program, it will be opened and immediately stored on the registered jump drive then in use as a novel .N11 document, upon certain conditions being met. For example, a registered jump drive must be found on or in direct communication with the device that is running the email program. Whether this drive is thusly present will be determined by the B' browser that has been designated to open the .exe, for example by examining the peripheral slots of the electronic device running the browser, first for the presence of a registered jump drive, and second for whether there is a valid container ID number on that drive. Further, the attachment .exe file's alphanumeric code must be valid. Whether it is valid will be determined by the B' browser. If both conditions are met, the operating .exe file of the registered jump drive will disarticulate the attachment .exe file to remove the respective .N11 file, and thereafter store only the .N11 under a file name that still will encompass the alphanumeric code, while also storing a copy of the original .exe on the registered jump drive.

When a viewer attempts to store a modified copy of any .N11 file, before it can be stored the operating software on the registered jump drive will compare the modified version to the original .exe itself, specifically in order to determine if any fee delimiters, either any ones in a string prior to, or alternatively "forward of the last-read string," have been removed during editing of the new .N11 version—the version that the viewer now hopes to store. This will be done so that correct payment for use of the .N11 cannot through such means be avoided by a viewer. Only if no relevant fee delimiters have been removed can storage of the new .N11 version occur, replacing the old version.

Multiple .exe attachments may be disarticulated, reconstituted, and stored on a single registered jump drive, making it in effect a "library" for all of those .N11 documents. Preferably, at the time of purchase, all .N11 documents will exist in a single copy. If a user chooses to place multiple .N11 materials on a single drive, he will be unable to loan these out singly, as individual items. Regardless of whether he stores many .N11 materials on the same drive or only on multiple drives, he will have but one copy of each one, whether this copy is annotated or clean, to keep or to loan out, unless he opts to purchase multiple copies of any .N11.

The operating executable file of the registered jump drive will allow an .N11 file to be erased from one drive while simultaneously being stored to a second drive that is present in another auxiliary slot, so as to allow files in a library that is present on a single drive to be loaned out while the overall library is retained, and to allow these loaned files to be returned in a similar manner. Alternative embodiments implement use of an associated log file to facilitate and record such transactions. Any such log file can be used to determine loan duration for purposes of, for example, billing.

If a publisher wishes to charge users to read .N11 items, he will have a novel means by which he may do so according to an embodiment of the method of this invention. Through use of a fourth delimiter type mentioned above, the publisher will be able to charge a varying amount, from no fee up to an indefinitely large fee, each time the user passes such a delimiter (under certain circumstances, a user will be paid to read an .N11 item, in which case negative fee amounts will be incurred). The publisher who utilizes such an approach will store on the registered jump drives he makes available a second .exe file, or other compiled program. This .exe file's function will be to maintain an account for the user with respect to this publisher. When a user acquires .N11 items, his maximum use fee will be stored into individual variables in this account .exe file on the registered drive. When a user reads one of these items, as he passes a fourth delimiter, the amount in the .N11 item's amount variable will be decremented according to the fourth delimiter in question, where accounts are pre-paid. Of course, other payment schemes, such as credit models, may be used, in which case the amount variable can be incremented.

In a case in which a computer program devised according to the method of this invention does not permit delimiters such as the fee delimiter meaningfully to be interpreted by the CPU except where they are encountered through the viewer's pressing the "regular" interleaf-skipping advance action key, in this example the right-arrow key, the author can make certain sets of modifications concomitantly in the program file and text-file of a document to work around this limitation.

As a non-limiting example, the author can code for a "redirect key" or "redirect keys" similar to the left-arrow action key previously described, through modifying the program file of the document. Such keys when pressed can direct a reader to the first string of a special section of the text-file which can preferably be placed beyond the end of the remainder of the document. In order to permit delimiters in the interleaf screens of such a section to operate correctly, the author can first code for an unusual pair of action keys in the program file, and second insert a "numerically correct" number of true interleaves (which themselves may be blank, for example) between each pair of the author's intended "meaningful" interleaves—these meaningful interleaves being, actually, in this instance pseudo-interleaves.

The particular pair of action keys here described preferably will be forward and back keys which when struck, will direct the CPU to skip that number of strings in the text-file corresponding to the number of interleaves encoded for in the program file of the document in general, multiplied by the number of pseudo-interleaves interposed between every pair of main pages in this particular section.

Readers when wishing to view interleaves, either before or after any of the main pages in this section, can first position themselves appropriately using the special forward and back keys particular to the section, and then utilizing the document's main, regular "forward action key" as employed elsewhere in the document, skip forward from the string representing one such pseudo-interleaf in this section to the next.

To reiterate, where this approach is employed by an author, all delimiters including fee delimiters which are emplaced in main pages or in pseudo-interleaves in the special section will "operate."

If the author wishes it, where more than one such section is to be employed within a document, among them these sections may utilize different constant numbers of pseudo-interleaves between pairs of main screens—it only being required for this to work, that appropriate sets of special forward and back action keys be programmed for in the program file and that in every respective section, the correct constant number of pseudo-interleaves be interposed between every pair of main screens.

When this approach is used by an author, a method can be employed to return the reader to the point from which he had departed, preferably through the reader's pressing a designated "return key" once the end of such a special section has been reached. This method may also be automatic, preferably with a note to the reader occurring suitably and automatically to inform the reader how the "rules of engagement" within this special section are changed—particularly meaning for instance, which two action keys are to be used in the section as forward and back keys, and that in the section accessing interleaves might not be free to the user.

Assuming that a user chooses to stop reading before finishing an .N11 file, he will be able to close and re-open this file, and to read up to this point as often as he likes, without incurring further fees. If he chooses to read beyond that point, however, he will incur further fees, and the amount variable for this .N11 file will be decremented according to the method of this invention.

In an alternative embodiment, one or more designated points in the document, for convenience hereinafter called "Go points," can be authored into the text file of an .N11 document. These Go points can be used as control-access points, to limit the reader's access to a page or pages of content occurring after the Go point. For example, it can be the case that a reader, once his forward progress has been paused at a Go point, will opt to go beyond it, further into an .N11 document, by pressing the "ordinary advance key," here, now to enter what will be referred to as an "infra-leaf section," or one of several such infra-leaf sections, comprising a simple page or pages of content, or a page or pages of content, up to all of which will be "interleaved."

At a Go point, a warning box or other notification may be displayed on the screen informing the reader that after that point, ordinary advance-key presses and/or presses of any other action keys may incur a fee.

This capability allows a publisher to assess fees not only for consumption of interleaves, but also for the consumption of infra-leaves; so, a reader may incur charges for consumption of any or all matter presented after some certain set point in an .N11 document, now without his needing to press any special key to access an interleaf.

All or some sections of an .N11 document can also occur as "pre-leaves," or that is to say, pages that will have been skipped over by the reader quite invisibly (excepting as they will have delayed the presentation of the normal first page infinitesimally) before he or she had reached the normal first page.

Pre-leaves can be provided free of charge to the reader, or they can be provided concomitantly with the assessment of a fee or multiple fees—in the latter case, the magnitude of which can depend on the exact extent of the consumption of content by the reader.

Pre-leaves can be presented on the reader's pressing a "back to the hidden beginning" key, or—in an alternate implementation in which the end of a document will comprise a Go point, or otherwise where emplacement of a certain, novel delimiter at a locus in a document by the author will cause such to arise there during the document's "play"—upon his pressing the ordinary advance key.

If a user affirmatively decides that he will not read further in this .N11 file, he can communicate this to the publisher or the publisher's agent in a manner that was previously designated as a mode to obtain a refund or credit. For example, he can send a "refund email" to a designated email address maintained by the publisher, sending this from the account from which he had purchased the corresponding .N11 file. He will attach to this email a file that will have automatically been created using an executable file that is present on all registered drives. This executable file, when invoked, will create a transaction file having as its file name the complete name, including alphanumeric code, of the unfinished .N11 file, and including in encrypted format the name of the respective amount variable, the alphanumeric code representing the respective registered jump drive, and the number that is in this amount variable at the time of this file's creation by the executable file.

In an alternative implementation intended to prevent a fraudulent refund request from being mistakenly granted by the publisher, in the refund email the current .N11 copy will be automatically included as an attachment. Then when the refund request is received by the publisher, this version will be compared against the original executable corresponding to it, which will be retained on the publisher's server, to ensure that the .N11 copy is intact and uncorrupted, and particularly that fee delimiters have not been removed.

At the time of the transaction file's creation, the respective amount variable on the registered jump drive will be re-set to zero. When such a "refund email" correctly bearing all requisite attachments is received by the publisher—for example, if a viewer's version of the .N11 file is attached, and this is subsequently found by the publisher to be intact—the user's account, such as his credit card account or a deposit account, will be credited the amount remaining in the amount variable (possibly reduced by a predetermined transaction amount)—where the checking of the attached .N11 file and the determination of whether a refund is appropriate can be carried out by an automatic "server-side" program that will be maintained by the publisher, or by the publisher manually, or by it automatically with the possibility of manual override. Subsequently, the user may open, read, and modify his own copy of this .N11 file as often as he likes, yet may not go beyond the point at which he stopped without logging back onto the publisher's website and increasing the amount variable for this file, to cover the maximum fee he might pay while reading the remainder of the file.

Similarly, if a reader has been able to complete an .N11 file without the amount variable for this file having been brought to zero—perhaps because he or she carefully and intelligently answered questions that were posed by the author as a pre-condition for reading more of the .N11 file—this reader can also send to the publisher such a "refund email" to obtain a partial refund of the maximum fee for the .N11 file. Any other type of reward offered by the publisher for correctly answering questions can be redeemed in a similar manner.

As mentioned above, a user can be allowed in certain circumstances to view the source code of one of his .N11 files, such as to add a comment in a user-modified version of this file. In such a case, it is preferable that the only source-code components he would be allowed to see would be those currently being displayed on his viewing device—or otherwise, only those, in conjunction with others that he had already viewed.

Thus, whenever a user would receive a refund for unused portions of a book from the publisher, all currently unused portions of the source code would be made inaccessible on his portable drive—either permanently, such as through deletion, or temporarily through a software method that would block utilization until the publisher would be repaid the refunded amount (plus conceivably a pro rata "restocking surcharge" or other fee).

This implementation would obviate the need to store a second, unalterable reference version of .N11 documents on the portable drive. It would also prevent canny, clever readers from reading the entire source code of a book and then returning it for a refund from the publisher, as unused.

The amount variable may be decremented precisely by the amount dictated by that fourth delimiter, or it may be decremented by an amount equaling the delimiter amount multiplied by a real or particularly a rational number that will be the current score multiplier. In .N11 materials published under this approach, the value of the current score multiplier, after initially being set to a value of 1, will vary according to a formula at the publisher's discretion, for example, as dictated by the user's scores on questions that he will intermittently be required to answer while reading this .N11 document, before being permitted to proceed.

As indicated elsewhere, such questions are preferably directed to material that a user should know based on what has already been presented in the .N11 document. Alternatively, the questions can be directed to information that has not been discussed, yet which someone who is qualified by reason of training to read this particular item should know or should infer from the previously-read material. Still alternatively, the questions can be irrelevant both to the material covered in the .N11 document and to the relevant topic field. In this case, for example, questions might be posed merely to slow a user's progress, and for no other reason, or they might be posed as a method of appropriately allocating cost, inasmuch as readers with more wealth or more indifference to spending on an .N11 item may more gladly answer questions indifferently simply to be able to continue reading, while others with less wealth or more available time will scrupulously answer the questions, to keep their costs low. Alternatively, if an author wishes to slow allocation of installments of a newly published .N11 item perhaps to mimic Dickens's "serialization" approach, or otherwise to draw out the time that a reader will have to contemplate and draw connections among information he had been exposed to—all of the questions might be physically or otherwise impossible to answer until a certain day. For example, the question might be related to a particular event that has yet to occur, but will occur with certainty and with a particular, discrete, "digital-format" result at a particular future time similar to an honest version of the old "Harlem numbers racket approach."

According to a basic implementation of the present invention, one which does not involve the use of interleaves, which will permit forward and backward movement through a modified document one page at a time only, it is possible for a final edited version of a manuscript to be presented, and for the writer's final draft also to be presented beside it, so comparisons between the two by interested readers may be made. Preferably, the two documents will be coded within a single string in three distinct, yet ultimately geometrically overlapping CSS div elements, the second and third of which will be separated from the first and second of which by means of a delay delimiter or a stop delimiter.

Without a delay delimiter or a stop delimiter being emplaced between divs in a string, the transition from one div to the next in programs created according to the invention, can occur almost instantaneously. This feature of such programs allows "CSS formatting shifts" and especially the automatic addition or deletion of annotation material such as annotation boxes to occur many times faster within a line than it does as the CPU reading frame moves from one string to the next automatically, absent a delimiter, while non-interleaf .N11 material is being displayed.

In thusly formatted edited materials, the second div element will always be formatted to overlap and conceal the first div element, and the third to overlap and conceal the second. The first CSS div element will include the author's final draft, while the second will constitute a two-color, or otherwise marked-up final edited version, and the third, an identically formatted monochromatic "clean," or that is to say, un-marked-up version. In an alternative implementation, two or three successive strings may be used instead of one string. In the two-color edited version, all additions by the editorial team can be shown in a different text color from that of the unchanged material, while all emendations from the author's final draft can be indicated and pointed to, for example through placement of an HTML tag, such as the "¤" tag, that may or may not be of the same color as the background color in either the former or particularly the latter edited version, at the point of the elimination of the original textual material. Where such a tag is displayed in the identical color as the background color, such a tag will not "show" unless the entire document is highlighted, or otherwise the pertinent passage is highlighted by the reader. Alternatively, the color of the tag can be similar to the background color, in which case the tag will appear but not stand out, unless that section or the whole page is highlighted by the reader.

In cases where within a string or between consecutive strings CSS shifts occur to obscure previous material without there being any stop delimiter between the elements, or perhaps with there being only a "too-brief" pause delimiter between them, according to the invention a motivated reader can create an altered copy of the .N11 document to include a stop delimiter before the "non-stopped" element to allow it to be read thenceforward. Alternatively, such a reader can employ the modified word processor function of the modified browser to open and to read the corresponding raw text-file without creating and storing an altered version.

An alternative approach, which will be effective in showing not only where text was removed but also which text was removed, is for an editor, or an author, to convert ordinary black text that is displayed against a white background, to white text against a gray background in the edited version. Where this has been done, if an interested viewer wishes to, he or she can reveal the "missing," in the sense of edited-away, text by highlighting the screen or sections of text. The same approach—that is, hiding material, yet hiding it in an open way in the expectation that some readers (whether particularly prompted to go searching for it or not, by the author) will find it—can be employed by authors in other contexts for heuristic or other reasons, including "perverse" in the sense of immature ones. Taking advantage of the fact that readers of documents created under this invention may more routinely than now open the source file of Web pages, authors can in a similar way and for like reasons—perhaps in conjunction with the foregoing approach—hide new information or comments in some strings as "non-displayed material," such as between angle brackets.

Other schemes for marking up edited text can be used, within the spirit and scope of the invention, as will be apparent to those of skill in the art.

According to an alternative formatting scheme for presentation of text differently between original pages and the corresponding interleaf pages, an original set of pages is presented to a user according to the method of the invention, these consisting of a long series of paragraphs that are individually or in groups, presented in like-formatted boxes having a background color that is other than the color of the text. Next, a corresponding set of interleaf pages can be presented to the user according to the method of the invention, these offering both the identical original material, with or without typographic or textual modifications, and between certain of those paragraphs, intercalated commenting or explaining paragraphs can be emplaced on the interleaf page, which will be similarly but not identically formatted to the long series of original paragraphs above and below them. Where secondary material is presented in an interleaf, the original material can be unchanged, or it can be modestly changed in terms of certain formatting features such as the color or bolding of text, to draw attention to individual words or thoughts. Likewise, in interleaves, even though the bulk of the text will be presented vertically in a series of paragraphs, this long rank of paragraphs can be accompanied by new material that will appear beside or partially overlapping the series of paragraphs in annotation boxes, as discussed elsewhere herein.

Particular embodiments include means by which any reader can usefully annotate his or her own copy of an .N11 document and file it in the sense of publish it as an "original document plus addenda" version through the publisher's website. Accordingly, for every "original document plus addenda" version that is sold, the original fee will still be paid automatically to the publisher, and in addition, some other amount—a multiple of the original fee amount equal to, greater than, or less than the original fee amount that would ordinarily be paid by a reader to the publisher of the original document for that document—can be paid as an "accessory" fee to the commenter.

Preferably, commenters will have an expert background or only sound insight according to some objective criteria, although neither of these will be necessary, unless, for example, so dictated by a publisher who opts to "pre-screen" comments to approve or disapprove of their addition to an existing document. A number of commenters can contribute in succession, all of whom will be paid what they originally would have been paid, each time the original document is sold with their respective comments added on. It is contemplated that commenters can take a good .N11 document and improve it, and also that they can take originals that have less value and make them more saleable.

Thus, the amount that authors and commenters can earn from their work will depend not only on the quality of their work, but also on factors that will initially be indeterminate, such as demand, perhaps after multiple rounds of commenting. Publishers, therefore, will be able to establish a protocol by which the price of the original work and prices of additional components can be modified later. These price modifications can be made by the publisher at will, and/or by the publisher, author, or subsequent commenters, by individual agreement or, for example, according to an algorithm, or as otherwise set up according to the publisher's preference.

.N11 documents can be published in which, prior to every page seen by readers on a normal first read-through of the document, there will be an interleaf that will be identical to the normally seen page; so this identical interleaf page can be accessed by a reader from the normally seen page through pressing a back-one-page-at-a-time key from the normally seen page, one time. Alternately and equivalently, such identical interleaf pages can be present after every normally seen page, so each identical interleaf can be accessed through the reader's pressing a forward-one-page-at-a-time key, one time. As well, such identical interleaf pages can be placed before and after each normally seen page.

Where an identical interleaf was inserted by an author before, or after, each normally seen page, readers taking notes can easily retain a clean and unmarked "reference version" of every page even where they wanted to "edit" or take notes on the normally seen pages.

To generate such documents, an author makes simple changes to the program file of the .N11 document in order to increment the number of interleaves that will be automatically skipped each time the advance key was pressed by one, while simultaneously duplicating each string and placing it appropriately in the text file, immediately before or after, or both, all of the normally seen pages. Readers can, as has been indicated elsewhere in this application, make notes on or more extensively edit pages they were reading through opening the source code of the document and then modifying the string representing that page in a text editing program—here doing this either with the string coding for the normally seen page or with the string coding for the corresponding interleaf—before saving the revised document under its original .N11 document name on the same registered jump drive where it had originally been stored.

Such interleaf pages at the reader's discretion might be kept "forever clean" for ease of reference, or they might be kept clean only temporarily, for example in order that the reader might be able to return to the .N11 document later in order to record new skeins of thought such as might occur to him on reflection after the passage of time, or such as could occur through a second reading. In an alternate implementation, such identical interleaf pages might be retained temporarily unmarked in order that some second commenter, or various commenters', ideas can be recorded in the same document, in addition to the original commenter.

The author can make the number of interleaves that will be present between every pair of normally seen pages vary from none or one, to any arbitrarily large number—this accomplished through the author's making simple changes to the document's program file while also appropriately duplicating every string representing each normally seen page the desired number of times, and placing the correct number of identical string copies suitably before or after, or both, every normally seen page. When reading such an .N11 document after modification, any reader—whether the original reader or another reader—will be able to access all of the here-discussed edited pages by pressing the back-one-page-at-a-time key (or the forward-a-page-at-a-time key, as appropriate) a suitable number of times.

If at any point in the text file, the author wishes to increase the number of "clean pages" that are intercalated between normally seen pages, so they will available for modification by readers, this can be accomplished by inserting one or more complete duplicate sets of original pages, plus interleaves, at that point. Only one of the original pages can contain one or more pause delimiters and must contain at least one stop delimiter. In the case of that set of interleaves which precedes (or follows) this "stopped" page, certain of the interleaves must be other than blank, if the author wishes to make any comments on and upon that original page in its interleaves.

Where one or more identical original pages precede a "single articulated original page"—the original page containing at least one stop delimiter and/or pause delimiters— the viewer will never see the duplicate pages as these pass by. The viewer will instead see as always, only a page stop.

Where the duplicated non-stopped page or pages follow the "stopped" original page, the viewer if noticing the duplicated original pages at all, will notice them merely in the sense that the "interpage transition" to the first original page after the stopped original page will seem marginally slower than usual, after the viewer strikes the action key to resume presentation.

If the reader and not the author is the one who wishes to expand opportunities for comment, the identical approach may be used. The reader can do so without needing to open the program file in order to modify the line-skip number pertaining to these strings. (According to the invention this technically is "counter-factual"; for under it, readers cannot access the program file! And even could it be done, still there would be the unfortunate side-effect that the number of interleaves per interleaf set would have to be increased constantly everywhere in the document—including around original pages that were of no interest or the value to the reader.)

Where an author might wish to allow individuals who had read up to a certain point in an "index document"—however, only those readers and no others—to access a presumably related "secondary" .N11 document, he can achieve this limitation through placing a hyperlink at a desired point in the index document, which when the hyperlink is activated will automatically open a form, allowing transmission of an email containing the respective coded .exe attachment to the reader's email account—much as discussed elsewhere in this application. Under this method, such .exe attachments can never be decoded other than by a B' browser as elsewhere described, and moreover they can neither be decoded nor stored except when the same registered jump drive on which the index document which was in the process of being read had been stored, was simultaneously present in an accessory drive on this same computer.

In an alternative implementation of the invention, an author, an editor, or a later commenter can record on paper his pertinent thoughts and ideas, insights, criticisms, qualifications, elaborations, further details, and further explanations that had not been presented in the "main-page" material itself, and which it was felt readers might want know after reading the respective main-page material.

Such notes are scanned as images in order to be placed as an "img" file at an appropriate point, such as through the Cascading Style Sheets formatting feature of HTML. Preferably, notes are set off from the text of the main-page, for example through use of paper of a different color than had been used in the main-page. Annotated pages can be inserted directly after or directly before the respective main page, as interleaves, for example.

Alternatively, notes, instead of being included in a document as interleaves, can be included in the same string that was coded for the respective main-page, for example at the end of it, after a stop code.

If material presented in a note is not easily readable or is not routinely intelligible—by design of its author—a "translation" of this can be offered to interested readers in a separate interleaf, after the payment of an additional fee or otherwise.

Notes can be recorded in cursive, printing, or block letters, and they can be by intent, legible, less legible, or completely illegible. Notes also can be presented in the form of sketches, diagrams, graphs, formulas, equations, and the like. Any verbal or non-verbal type of note can be used.

Notes can be presented in shorthand. When shorthand is used, the shorthand system that is used can be a conventional system of shorthand, or it can be a non-conventional and obscure system, which is not easily readable by the uninitiated. Also, note material can be typed.

Notes can be augmented with further handwritten amendments, emendations, or corrections, or other editing—where such can be made by the author of the note himself, or by an editor or a later commenter.

According to another aspect of the invention, an author who has created a single- or multi-screen document can using ordinary word-processing software make one or more secondary copies of this version that differ from the primary version and between each other in one or more places in terms of word choice or phraseology, inclusion or omission of words, passages, paragraphs or sections, inclusion or omission of special CSS-formatted boxes or html-formatted sections, in terms of the color of highlighting or the presence or absence of highlighting, and in terms of the text color, text size, font style, bolding, or italicization of single words or groups of words or of passages, paragraphs, and sections. As well, secondary versions can differ from the primary version and from each other in terms of the background color of the page. Secondary versions can have "empty strings" added at their beginning or end but preferably will be of the same string-length as the primary version. Such secondary versions can be placed in the text file of the .N11 document, preferably in sequence and in register.

In .N11 documents employing this approach, pairs of back-and-forth toggling action keys and individual "skipping-action keys" can be coded by an author in the program file. In a preferred embodiment each one of a pair of toggling action keys would increase or decrease a reading frame variable as defined in the program file by a constant amount equal to the number of strings in the primary and secondary versions. By pressing one and then the other such toggling action keys, a reader could toggle between two or more versions of the same screen, in-register in different bits. By pressing a skipping action key a reader could cause his current reading frame to be redirected to a string elsewhere in the same version or in a different version—including to the same string where he had originally started out.

Some in-register matched screens in different bits cannot differ between one another, whereas others can, in certain by-the-author-intended details. In-register matched screens can differ merely in terms of word choice—the choice of a single word or several words—or can differ much more broadly, with quite substantial amendations, emendations, and additions, from one version to the next.

New information can simply be added for instance between words or at the end of a line, or can be made to stand out in various ways.

For example, if the .N11 document is a simple factual document such as a conventional piece of news reportage, the more complicated string or strings of a pair or of a group of matched, in-register strings can present facts that the primary, most basic string in the pair or the group has not. As another possibility, if the .N11 is a theoretical or disputative work of an academic or political nature, the more complicated string or strings of a pair or group of matched, in-register strings can present a variety of contrasting or complementary ideas and arguments that particularly the most basic string does not. Both situations can apply. The more complicated version or versions of a screen can qualify or further explain concepts that the basic version simply presents. In a non-fictional work these approaches can be combined. Where a work is fictional, somewhat similar approaches can be used. And "more globally," in a fiction work the secondary version or versions of a matched screen can offer very complex and involved information that the author felt he ought to hold back from the basic screen because if this was offered immediately, it would hopelessly muddy the plot. By the author of a fiction or a non-fiction work, it may be assumed that whereas some percentage of the readers will at their own volition read all of the alternate versions at once, before they go on to the next screen in the basic version, another percentage will wait to read any of the alternate versions until they have completed their first reading of the basic work, and yet a third percentage will "mix and match." If this is unsatisfactory to an author, as a non-limiting example he can give his readers guidance and direction on when to consult secondary versions, through making instructions on how to read the work available at the time when the overall document is opened, or screen by screen as readers progress through the basic version, or both.

In a fiction or non-fiction .N11 document, a secondary in-register matched string can represent an author's preliminary or rough draft—hence, a secondary version can present facts and ideas; words, phrases, paragraphs and sections of text; and alternate choices of words not in the primary version of the string; contrariwise, the primary version of a string can represent a rough draft, while a secondary version or several secondary versions can represent varying, polished, more final drafts. Such a change between early and final drafts can have been made for various reasons, for instance because it had been observed by the author or the editor that "too much information, too soon" would confuse readers, although there can be many other justifications for holding back or putting into some versions but not others, new information and alternate word choices, among other things. Secondary versions of a screen can contain variant word choices that had not been present in early drafts, but which will be included in the secondary versions of the screen to refine the meaning of a phrase or thought. Where matched screens are present and it is expected that interested readers will toggle between them, typographic features such as text color, font size, font style, bolding, italicization, and highlighting, and formatting features such as CSS can be used by an author or editor to draw attention to differences between the preliminary and secondary versions of a screen. It can be the case that between matched screens there will be no differences; and it can be the case that between matched screens no special features will be utilized to draw attention to what differences there are.

Where the approach of emplacing one or more than one matched version in a document is to be used by an author, these versions will be emplaced in the text file, while simultaneously the program file will be altered to enable readers easily to access the alternate versions. In particular "skipping action keys," including, potentially, toggling action keys, will be designated in the program file by the author.

Thus, to permit skipping or toggling by the reader, when the reader presses a skipping or toggling action key, the current value of a reading frame variable in the program file will increase or decrease by a number designated by the author within the program file. Skipping keys may be paired so where one action key will advance the reading frame by a certain number of units, then its pair will reduce the reading frame the same number; thus using both keys together, the reader can toggle between alternate matched screens in primary and secondary versions. In the case of toggling action keys, the "skip number" utilized by the author will be the number of strings in each version. Otherwise, whether or not more than one matched version of a document is used by an author, a skipping key can take readers to a position in the text file beyond the end of the core narrative or discussion, to a single string or the first in a series of strings—whether these strings will themselves be matched by other strings elsewhere in the text file, or not—that can offer to the reader the author or the editor's overarching comments on material that the reader at this point should have read. Such commenting material may therefore be in effect like a foreword or an afterword; but it can also a represent a "midword" that is to be invoked by a reader neither before or after the main narrative or discussion has been read, but is to be invoked from a certain chosen point within the document. In order to allow the reader to reach such a screen or the first in a series of such screens, the program file will be appropriately modified by the author, to encode a skipping action key or pair of skipping action keys; the reader then could for example press a standard keyboard "f" to advance to the commenting "beyond-main" commenting string or series of such strings, then pressing a standard keyboard "e" to return to the point of departure. Where such modifications are emplaced in the program file by the author, the "departing skipping action key" and its partner can change the reading frame correspondingly to two different, definite integer values, these representing, respectively, the string number of the "beyond-main" commenting string or the first in a series of these "beyond-main" commenting strings, and the string number of the point of departure. Once the beyond-main commenting screen or screens have been visited by the reader, instead of returning to the point of origin, he can be invited to press a different skipping action key to go now to a jamais vu screen or screens or to some not recently viewed déjà vu screen or screens, before for instance returning to the point of departure.

An author can encourage interested readers to make their own revised or edited rendition of the original document, where this action can be engaged in destructively—through modification or deletion of strings in the original—or non-destructively—through creation of a reader's version or versions, in a position in the text file that follows the end of the original document, for instance. Destructive and non-destructive approaches can both be employed in the same revised rendition. When a revised rendition of a document has been made wherein a reader's version or versions have been created, readers can be able to toggle between original versions and reader's versions in the modified document if the program file of the original has been modified to enable toggling.

As one non-limiting option to create a revision, a reader can open the source file of an .N11 document, copy the strings he would like to modify from the original text file, and modify them in a word processing application before inserting the result back into the text file one or more strings after its end, at a by-the-author designated string-number, assuming to that string number the author has previously designated a skipping action key. Optionally, this previously defined string-number action key can be one of several.

The reader can create an edited version to improve the language of the original, summarize its information, add information, and/or add insights, observations, or criticisms. Hyperlinks can be added. Information can be added to the edited version from external sources. Passages in an original version can be abridged or abbreviated and can be typographically altered. Language in the original can be corrected or it can be corrected from the reader's idiosyncratic viewpoint, and can be made stylistically more pleasing to the reader. Editing changes can be intended to facilitate the reader's understanding during the very first read, or can be intended to aid understanding, insight, and learning during later re-readings. They can be made to allow re-reading to occur more rapidly and comprehensibly, and generally to make it more productive. Editing changes can be made for the sake of individuals who would buy the reader's revised version later, as discussed elsewhere in this document. Thus, a reader can create a "commented" version that he feels adds value and make it available on the publisher's website. Words in the original can be replaced by other words. New words can be added to existing lines of text, or can be added within CSS- or html-formatted boxes beside or superimposed over original text.

A publisher can enable readers who may be concerned about the possibility of losing a registered jump drive and therefore their only copy of an .N11 document or documents to store a backup copy of the document or documents with a registered escrow agent and perhaps also to store revisions that they may make with this escrow agent. Fees can be assessed for storage of a backup copy, for storage of revised versions, and for downloading of a replacement version, as non-limiting examples.

A publisher can alternatively refuse to allow a registered escrow agent to be used. Particularly in this case, the publisher can offer for sale specially designed hollowed-out books, the hole in whose pages would exactly fit a jump drive. Consumers can be encouraged to buy one such hollow book for each book they own, one or various subdivisions of their collection of books, or one for their entire library.

According to another aspect of the invention, electronic books can be created so that in sections of these, the author can employ variable delay delimiters to slow the turning of pages, while otherwise in the document, he can take advantage of the near-instantaneous page-turns afforded under the invention.

According to another aspect of the invention, in particular, web-based publishers will be enabled to charge for consumption of a page of an electronic book, or a subunit thereof. As discussed generally above, publishers are enabled to assess per-unit fees variably, where either of two things may be meant by the term, "variable": (1) fees that are discretely variable per electronic unit consumed, where each fee will be determined as a constant integer, decimal, or fraction by the publisher for any and all readers; or (2) fees that vary starting from a predefined-by-the-publisher variable base and then are incremented or alternatively multiplied according to a formula to yield a fee for the consumption of the certain unit by a reader.

It should be apparent to those of skill in the art that, through simple modifications, a publisher may make "multipliable" copies available to institutions for their subordinate sale, rental, or lending, such as by libraries to patrons or by schools and universities to students, or in other situations in which group dissemination of a work is contemplated.

For example, such modifications could involve the forwarding of a list of recipient individuals' email addresses, registered jump drive alphanumeric codes, and B' browser alphanumeric codes to the publisher by the institutional buyer, for example through a secure website interface that is maintained by the publisher for this purpose. Terms are set forth by the publisher for, or an agreement between the publisher and an institutional buyer is reached as to, per-resale, per-rental, or per-borrowing costs for any multipliable document; likewise, terms are forth by the publisher for, or an agreement between the publisher and an institutional buyer is reached as to, the percentage of the ordinary and regular .N11 document's "use assessment charges" that will accrue to the publisher on the one hand, and to the institution on the other. The publisher's portion can be added to a base fee that may be levied on the institution for acquisition of the multipliable copy.

The present invention encompasses methods of restricting or controlling the duplication, altering, dissemination, and other forms of access of document files, through use of an exemplary content management system. For example, with reference to FIGS. 17-24, prevention of unauthorized modification of a document file can be provided when creating the document file. As mentioned previously, the document file is a mutable computer-readable file that includes content for presentation to a user. A dedicated browser or other user interface application used to present the content, and a portable storage device having a globally unique identifier on which the document file can be stored, are used under control of a content management system to enforce duplication prevention and other access control through the use of encryption.

For example, the document file can be encrypted by the publisher before being stored on the storage device and provided to the user. The publisher only stores the encrypted document file on a storage device that is associated with a globally unique identifier and is registered with the content management system, and the encryption process can include the identifier, thereby linking the encrypted document file to the particular storage device on which it is stored. The encrypted document file may only be decrypted by a user providing an identifier corresponding to the globally unique identifier. Other conditions can be imposed with respect to moving the encrypted document file. For example, if the encrypted document file is currently stored on a first registered storage device, the encrypted document file can be moved to a second registered storage device. However, the content management system can render the encrypted document file able to be moved from this original storage location only if the encrypted document file is stored on a designated second registered storage device, and not on an unregistered storage device. As another example, the content management system can render the encrypted document file able to be moved from a first registered storage device on which it is stored to a second registered storage device only if the encrypted document file is erased from the first registered storage device, and unable to be moved to a different registered storage device otherwise. Further, the document file will have to be encrypted using the globally unique identifier of the second storage device before it can be stored on that device.

However, it is possible for the encrypted document file document file, stored on the registered storage device, to be altered by a user. The encrypted document file can be altered by a user by copying only a content portion of the encrypted document file using a dedicated content editor that is configured within the dedicated browser or other user interface. The copied content portion of the encrypted document file can be altered using the dedicated content editor, and the altered copied content portion of the encrypted document file can be stored using the dedicated content editor by replacing the content portion of the encrypted document file stored on the registered storage device by the altered copied content portion of the encrypted document file, and using the dedicated browser conjointly with the registered storage device operating system to store the altered encrypted document file. In this case, the browser can be restricted such that it can only open a content portion using the dedicated content editor. Thus, alteration of a document by a user is possible, but is restricted to alteration using a dedicated content editor, and storage of the altered document file is also restricted.

The encryption/decryption process enforced by the content management system can also require the use of cryptographic keys as part of the encryption/decryption process. For example, an encryption key, along with the globally unique identifier, can be used as inputs to an encryption algorithm to generate the encrypted document file to be stored on the registered storage device, according to any encryption process apparent to those of skill in the art. Likewise, the user, at his or processing device, must supply an identifier associated with the globally unique identifier and a decryption key corresponding to the encryption key, to decrypt the encrypted document file before the document file can be accessed by the user. According to cryptographic schemes apparent to those of skill in the art, the content management system can enforce policies to grant particular document file access to the user. For example, "read-only" access can be granted to a particular user for a particular document file, which access can be expanded or otherwise changed at the discretion of the publisher and though the control of the content management system.

Further, an executable file including the encrypted document file can be created at a first device and transferred from the first device to a receiving device. This receiving device can be a second device, or it can be the first device, such as when the first device is a node that is shared by two or more users. For example, the transfer of the executable file can be made via email, which can be received by a recipient at another device, or by another recipient at the same device, usually via a different user account than that used by the sender. The encrypted document file can be opened from the executable file only if the receiving device is communicatively connected to a registered storage device. If this is the case, the encrypted document file is stored on the registered storage device. Opening the encrypted document file if the receiving device is not communicatively connected to a registered storage device is thereby prevented.

Through simple modifications, a publisher may absolutely enjoin on a temporary basis, or in journalistic parlance "embargo," readers from utilizing an .N11 document that logically is subordinate to a simpler index electronic document, which at the publisher's preference may be published as an .N11 document or as another sort of electronic book, or as a simple web page.

In an exemplary embodiment, a single- or multi-page news summary of some recent event is made available free of charge, or otherwise for pay, on-line to all potential readers, through the website of a news organization maintained by the publisher.

This index document in some part may contain one or more links to relevant, more complex, subordinate .N11 documents; but under the terms of this embodiment, such links for the term of the embargo are not accessible to embargoed readers. For example, in such cases, through clicking on the link in an index document embargoed readers can be redirected to a dead, temporary "wrong link" by the publisher working within the control panel of its website host. As a non-limiting example, such temporary wrong links can be associated with a relatively meaningless website having content that does no more than notify readers of the embargo and its duration.

When the embargo and the redirected link action are removed, thereafter any de-embargoed link or links will function correctly—so when one is clicked on by a reader, it will take that reader to the URL originally designated by the author at this point in the index document.

In another embodiment of the invention, readers in addition to being charged a fee when passing a fee delimiter in the delimited portion of an .N11 document may be assessed a constant fee for each keypress of one or several action keys, according to the programming of these keys in the program file of an .N11 document. To effectuate this change, an action key or keys can be created in the program file so that when struck, in addition to the reading frame of the document being changed through alteration of the value of a current Index variable, a fee variable pertaining to this action key or to a joint set of such action keys will be incremented by one.

According to another embodiment of the invention, certain individual and within-themselves complete .N11 documents may be authored so as to embody "mathematically soft embargoes"—embargoes against the reader's changing the reading frame within the document through depressing an action key, nevertheless which embargoes through modification of the program file by a publisher will be made "clock-dependent" in such a way that over time, the reader's fee for pressing the action key will by a mathematical formula or program, be decremented.

The mathematical formula or program may embody a variable or variables the current value of which will depend on reader action—as a non-limiting example, the value of such variables depending on the reader's answers to one or more "ongoing test questions" that will be posed to the reader regarding the text.

Particular exemplary embodiments of the present invention have been described in detail. These exemplary embodiments are illustrative of the inventive concept recited in the appended claims, and are not limiting of the scope or spirit of the invention as contemplated by the inventor.

I claim:

1. A method of controlling access to a document file, comprising:
    creating the document file, wherein the document file is a mutable computer-readable file that includes content, wherein the content is presentable to a user on an electronic display device;
    encrypting the document file; and
    providing the encrypted document file to the user, including storing the encrypted document file on a content storage device, wherein the content storage device is associated with a unique global identifier;
    wherein encrypting the document file includes applying an encryption algorithm to the document file to reversibly encipher the document file; and
    wherein applying the encryption algorithm to the document file includes providing an encryption key and the unique global identifier and actuating the encryption algorithm with the encryption key and the unique global identifier;
    the method further comprising:
    opening, by the user, a user interface application, on a processing device;
    coupling the content storage device for communication with the processing device;
    selecting for access, by the user by way of the user interface application, the encrypted document file;
    decrypting, by the user interface application, the encrypted document file; and
    presenting the content included in the decrypted document file to the user on the electronic display device, within the user interface application;
    wherein decrypting the encrypted document file includes applying a decryption algorithm associated with the encryption algorithm to the encrypted document file to decipher the encrypted document file;
    wherein applying the decryption algorithm to the encrypted document file includes providing a decryption key associated with the encryption key, and the unique global identifier, and actuating the decryption algorithm with the decryption key and the unique global identifier; and
    wherein the decrypted document file is configured to be opened only within the user interface application;
    the method further comprising controlling, by the user interface application, access to the decrypted document file;
    wherein controlling, by the user interface application, access to the decrypted document file includes allowing, by the user interface application, modification of the decrypted document file by the user;
    wherein modification of the decrypted document file by a user includes:
    loading the decrypted document file into temporary storage in the processing device;
    copying only a text file portion of the decrypted document file using a text editor that is configured within the user interface application;
    modifying the copied text file portion of the decrypted document file using the text editor; and
    storing the modified copied text file portion of the decrypted document file using the text editor by replacing the text file portion of the decrypted document file stored in the temporary storage by the modified copied text file portion of the modified document file.

2. The method of claim 1, further comprising embedding the decryption algorithm within the user interface application.

3. The method of claim 1, further comprising storing the unique global identifier in a processor storage device accessible by the user interface application.

4. The method of claim 3, further comprising encrypting the unique global identifier prior to storing the unique global identifier in the processor storage device.

5. The method of claim 4, further comprising decrypting, by the user interface application, the encrypted unique global identifier, prior to decrypting the encrypted document file.

6. The method of claim 1, further comprising storing the decryption key in a processor storage device accessible by the user interface application.

7. The method of claim 6, further comprising encrypting the decryption key prior to storing the decryption key in the processor storage device.

8. The method of claim 7, further comprising decrypting, by the user interface application, the encrypted decryption key, prior to decrypting the encrypted document file.

9. A content management system comprising system memory storing instructions that, when executed by a processor implement the method of claim 1.

10. The method of claim 1, wherein:
presenting the decrypted document file to the user on the electronic display device includes loading the decrypted document file into temporary storage in the processing device; and
controlling, by the user interface application, access to the decrypted document file includes
erasing, by the user interface application, the document file from the content storage device when loading the decrypted document file into temporary storage in the processing device, and
erasing, by the user interface application, the document file from the temporary storage when transferring the document file to the content storage device.

11. The method of claim 10, wherein the content storage device is a first content storage device and the unique global identifier is a first unique global identifier, the method further comprising:
coupling a second content storage device for communication with the processing device, wherein the second content storage device is associated with a second unique global identifier;
checking the processor storage device for the second unique global identifier;
storing the document file on the second content storage device, only if the second unique global identifier is stored in the processor storage device; and
erasing, by the user interface application, the document file from the temporary storage when transferring the document file to the second content storage device.

12. The method of claim 1, wherein the document file is an executable file.

13. The method of claim 12, wherein providing the encrypted document file to the user includes emailing the executable file to the user.

14. A method of controlling access to a document file, comprising:
creating the document file, wherein the document file is a mutable computer-readable file that includes content, wherein the content is presentable to a user on an electronic display device;
encrypting the document file; and
providing the encrypted document file to the user, including storing the encrypted document file on a content storage device, wherein the content storage device is associated with a unique global identifier;
wherein encrypting the document file includes applying an encryption algorithm to the document file to reversibly encipher the document file; and
wherein applying the encryption algorithm to the document file includes providing an encryption key and the unique global identifier and actuating the encryption algorithm with the encryption key and the unique global identifier;
the method further comprising:
opening, by the user, a user interface application, on a processing device;
coupling the content storage device for communication with the processing device;
selecting for access, by the user by way of the user interface application, the encrypted document file;
decrypting, by the user interface application, the encrypted document file; and
presenting the content included in the decrypted document file to the user on the electronic display device, within the user interface application;
wherein decrypting the encrypted document file includes applying a decryption algorithm associated with the encryption algorithm to the encrypted document file to decipher the encrypted document file;
wherein applying the decryption algorithm to the encrypted document file includes providing a decryption key associated with the encryption key, and the unique global identifier, and actuating the decryption algorithm with the decryption key and the unique global identifier; and
wherein the decrypted document file is configured to be opened only within the user interface application;
the method further comprising controlling, by the user interface application, access to the decrypted document file;
wherein presenting the decrypted document file to the user on the electronic display device includes loading the decrypted document file into temporary storage in the processing device; and
wherein controlling, by the user interface application, access to the decrypted document file includes
erasing, by the user interface application, the document file from the content storage device when loading the decrypted document file into temporary storage in the processing device, and
erasing, by the user interface application, the document file from the temporary storage when transferring the document file to the content storage device.

15. The method of claim 14, wherein the content storage device is a first content storage device and the unique global identifier is a first unique global identifier, the method further comprising:
coupling a second content storage device for communication with the processing device, wherein the second content storage device is associated with a second unique global identifier;
checking the processor storage device for the second unique global identifier;
storing the document file on the second content storage device, only if the second unique global identifier is stored in the processor storage device; and
erasing, by the user interface application, the document file from the temporary storage when transferring the document file to the second content storage device.

16. The method of claim 14, further comprising embedding the decryption algorithm within the user interface application.

17. The method of claim 14, further comprising storing the unique global identifier in a processor storage device accessible by the user interface application.

18. The method of claim 17, further comprising encrypting the unique global identifier prior to storing the unique global identifier in the processor storage device.

19. The method of claim 18, further comprising decrypting, by the user interface application, the encrypted unique global identifier, prior to decrypting the encrypted document file.

20. The method of claim 14, further comprising storing the decryption key in a processor storage device accessible by the user interface application.

21. The method of claim 20, further comprising encrypting the decryption key prior to storing the decryption key in the processor storage device.

22. The method of claim 21, further comprising decrypting, by the user interface application, the encrypted decryption key, prior to decrypting the encrypted document file.

23. The method of claim 14, wherein controlling, by the user interface application, access to the decrypted document file includes preventing, by the user interface application, duplication of the decrypted document file.

24. The method of claim 14, wherein controlling, by the user interface application, access to the decrypted document file includes preventing, by the user interface application, storage of the decrypted document file other than on the content storage device having the unique global identifier.

25. The method of claim 14, wherein controlling, by the user interface application, access to the decrypted document file includes preventing, by the user interface application, modification of the decrypted document file by the user.

26. The method of claim 14, wherein controlling, by the user interface application, access to the decrypted document file includes preventing, by the user interface application, storage of the modified document file other than on the content storage device having the unique global identifier.

27. The method of claim 14, wherein controlling, by the user interface application, access to the decrypted document file includes allowing, by the user interface application, modification of the decrypted document file by the user.

28. The method of claim 27, wherein modification of the decrypted document file by a user includes:
loading the decrypted document file into temporary storage in the processing device;
copying only a text file portion of the decrypted document file using a text editor that is configured within the user interface application;
modifying the copied text file portion of the decrypted document file using the text editor; and
storing the modified copied text file portion of the decrypted document file using the text editor by replacing the text file portion of the decrypted document file stored in the temporary storage by the modified copied text file portion of the modified document file.

29. The method of claim 14, wherein the document file is an executable file.

30. The method of claim 29, wherein providing the encrypted document file to the user includes emailing the executable file to the user.

31. A content management system comprising system memory storing instructions that, when executed by a processor implement the method of claim 14.

32. A method of controlling access to a document file, comprising:
creating the document file, wherein the document file is a mutable computer-readable file that includes content, wherein the content is presentable to a user on an electronic display device;
encrypting the document file; and
providing the encrypted document file to the user, including storing the encrypted document file on a content storage device, wherein the content storage device is associated with a unique global identifier;
wherein encrypting the document file includes applying an encryption algorithm to the document file to reversibly encipher the document file;
wherein applying the encryption algorithm to the document file includes providing an encryption key and the unique global identifier and actuating the encryption algorithm with the encryption key and the unique global identifier; and
wherein the document file is an executable file.

33. The method of claim 32, further comprising:
opening, by the user, a user interface application, on a processing device;
coupling the content storage device for communication with the processing device;
selecting for access, by the user by way of the user interface application, the encrypted document file;
decrypting, by the user interface application, the encrypted document file; and
presenting the content included in the decrypted document file to the user on the electronic display device, within the user interface application;
wherein decrypting the encrypted document file includes applying a decryption algorithm associated with the encryption algorithm to the encrypted document file to decipher the encrypted document file; and
wherein applying the decryption algorithm to the encrypted document file includes providing a decryption key associated with the encryption key, and the unique global identifier, and actuating the decryption algorithm with the decryption key and the unique global identifier.

34. The method of claim 33, wherein the decrypted document file is configured to be opened only within the user interface application.

35. The method of claim 34, further comprising controlling, by the user interface application, access to the decrypted document file.

36. The method of claim 35, wherein controlling, by the user interface application, access to the decrypted document file includes allowing, by the user interface application, modification of the decrypted document file by the user.

37. The method of claim 36, wherein modification of the decrypted document file by a user includes:
loading the decrypted document file into temporary storage in the processing device;
copying only a text file portion of the decrypted document file using a text editor that is configured within the user interface application;
modifying the copied text file portion of the decrypted document file using the text editor; and
storing the modified copied text file portion of the decrypted document file using the text editor by replacing the text file portion of the decrypted document file stored in the temporary storage by the modified copied text file portion of the modified document file.

38. The method of claim 35, wherein controlling, by the user interface application, access to the decrypted document file includes preventing, by the user interface application, duplication of the decrypted document file.

39. The method of claim 35, wherein controlling, by the user interface application, access to the decrypted document file includes preventing, by the user interface application, storage of the decrypted document file other than on the content storage device having the unique global identifier.

40. The method of claim 35, wherein controlling, by the user interface application, access to the decrypted document file includes preventing, by the user interface application, modification of the decrypted document file by the user.

41. The method of claim 35, wherein controlling, by the user interface application, access to the decrypted document file includes preventing, by the user interface application, storage of the modified document file other than on the content storage device having the unique global identifier.

42. The method of claim 35, wherein:
presenting the decrypted document file to the user on the electronic display device includes loading the decrypted document file into temporary storage in the processing device; and
controlling, by the user interface application, access to the decrypted document file includes
erasing, by the user interface application, the document file from the content storage device when loading the decrypted document file into temporary storage in the processing device, and
erasing, by the user interface application, the document file from the temporary storage when transferring the document file to the content storage device.

43. The method of claim 42, wherein the content storage device is a first content storage device and the unique global identifier is a first unique global identifier, the method further comprising:
coupling a second content storage device for communication with the processing device, wherein the second content storage device is associated with a second unique global identifier;
checking the processor storage device for the second unique global identifier;
storing the document file on the second content storage device, only if the second unique global identifier is stored in the processor storage device; and
erasing, by the user interface application, the document file from the temporary storage when transferring the document file to the second content storage device.

44. The method of claim 33, further comprising embedding the decryption algorithm within the user interface application.

45. The method of claim 33, further comprising storing the unique global identifier in a processor storage device accessible by the user interface application.

46. The method of claim 1, wherein controlling, by the user interface application, access to the decrypted document file includes preventing, by the user interface application, duplication of the decrypted document file.

47. The method of claim 1, wherein controlling, by the user interface application, access to the decrypted document file includes preventing, by the user interface application, storage of the decrypted document file other than on the content storage device having the unique global identifier.

48. The method of claim 1, wherein controlling, by the user interface application, access to the decrypted document file includes preventing, by the user interface application, modification of the decrypted document file by the user.

49. The method of claim 1, wherein controlling, by the user interface application, access to the decrypted document file includes preventing, by the user interface application, storage of the modified document file other than on the content storage device having the unique global identifier.

50. The method of claim 45, further comprising encrypting the unique global identifier prior to storing the unique global identifier in the processor storage device.

51. The method of claim 50, further comprising decrypting, by the user interface application, the encrypted unique global identifier, prior to decrypting the encrypted document file.

52. The method of claim 33, further comprising storing the decryption key in a processor storage device accessible by the user interface application.

53. The method of claim 52, further comprising encrypting the decryption key prior to storing the decryption key in the processor storage device.

54. The method of claim 53, further comprising decrypting, by the user interface application, the encrypted decryption key, prior to decrypting the encrypted document file.

55. The method of claim 32, wherein providing the encrypted document file to the user includes emailing the executable file to the user.

56. A content management system comprising system memory storing instructions that, when executed by a processor implement the method of claim 32.

* * * * *